(12) United States Patent
Mansour et al.

(10) Patent No.: US 10,434,457 B2
(45) Date of Patent: Oct. 8, 2019

(54) METHOD OF CAPTURING CARBON DIOXIDE

(71) Applicant: KING FAHD UNIVERSITY OF PETROLEUM AND MINERALS, Dhahran (SA)

(72) Inventors: Rached Ben Mansour, Dhahran (SA); Naef Qasem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 142 days.

(21) Appl. No.: 15/717,131

(22) Filed: Sep. 27, 2017

(65) Prior Publication Data

US 2019/0091624 A1     Mar. 28, 2019

(51) Int. Cl.
| | | |
|---|---|---|
| *B01D 53/04* | (2006.01) | |
| *B01J 20/20* | (2006.01) | |
| *B01J 20/18* | (2006.01) | |
| *B01J 20/22* | (2006.01) | |
| *B01D 53/02* | (2006.01) | |

(52) U.S. Cl.
CPC ......... *B01D 53/0423* (2013.01); *B01D 53/02* (2013.01); *B01J 20/18* (2013.01); *B01J 20/205* (2013.01); *B01J 20/226* (2013.01); *B01D 2253/102* (2013.01); *B01D 2253/108* (2013.01); *B01D 2253/204* (2013.01); *B01D 2253/25* (2013.01); *B01D 2256/10* (2013.01); *B01D 2257/504* (2013.01)

(58) Field of Classification Search
CPC ............... B01D 53/02; B01D 53/0423; B01D 2253/102; B01D 2253/108; B01D 2253/204; B01D 2253/25; B01D 2256/10; B01D 2257/504; B01J 20/18; B01J 20/205; B01J 20/226
See application file for complete search history.

(56) References Cited

U.S. PATENT DOCUMENTS

| | | |
|---|---|---|
| 2004/0118287 A1 | 6/2004 | Jaffe et al. |
| 2013/0192281 A1 | 8/2013 | Nam et al. |

(Continued)

FOREIGN PATENT DOCUMENTS

| | | |
|---|---|---|
| KR | 10-2010-0031345 A | 3/2010 |
| WO | 2016/114991 A1 | 7/2016 |

OTHER PUBLICATIONS

Anbia et al. ("Development of MWCNT@MIL-101 hybrid composite with enhanced adsorption capacity for carbon dioxide" Chemical Engineering Journal 191 (2012) 326-330) (Year: 2012).*

(Continued)

*Primary Examiner* — In Suk C Bullock
*Assistant Examiner* — Jason Y Chong
(74) *Attorney, Agent, or Firm* — Oblon, McClelland, Maier & Neustadt, L.L.P.

(57) ABSTRACT

A $CO_2$ adsorbent that includes MIL-100(Fe) and various amounts of carbon nanotubes that are dispersed therein, and a method of capturing $CO_2$ with a $CO_2$ adsorbent that includes an adsorbent matrix of a zeolite and/or a metal organic framework and carbon nanotubes that are dispersed within the adsorbent matrix. Various embodiments of the $CO_2$ adsorbent and the method of capturing $CO_2$ are also provided.

11 Claims, 12 Drawing Sheets

(56) References Cited

U.S. PATENT DOCUMENTS

2013/0298769 A1* 11/2013 Petruska ............... B01D 53/02
 95/139
2015/0238930 A1* 8/2015 Said ...................... B01J 20/226
 502/401

OTHER PUBLICATIONS

Xiang et al. ("Metal—Organic Frameworks with Incorporated Carbon Nanotubes: Improving Carbon Dioxide and Methane Storage Capacities by Lithium Doping**"' Angew. Chem. Int. Ed. 2011, 50, 491-494) (Year: 2011).*

Chan et al. ("Measurement of properties and performance prediction of the new MWCNT-embedded zeolite 13X/CaCl2 composite adsorbents" International Journal of Heat and Mass Transfer 89 (2015) 308-319) (Year: 2015).*

Lee et al. ("Adsorption Equilibria of CO2 on Zeolite 13X and Zeolite X/Activated Carbon Composite" J. Chem. Eng. Data 2002, 47, 1237-1242) (Year: 2002).*

Qadir, N.U., et al., "Synthesis, Characterization, and Water Adsorption Properties of a Novel Multi-Walled Carbon Nanotube/MIL-100(Fe) Composite", Dalton Transactions, vol. 45, pp. 15621-15633, (2016).

Anbia, M., et al., "Development of MWCNT@MIL-101 Hybrid Composite with Enhanced Adsorption Capacity for Carbon Dioxide", Chemical Engineering Journal, vol. 191, 1 Page total (May 15, 2012) (Abstract only).

Kang, Z., et al., "Hybrid Metal-Organic Framework Nanomaterials with Enhanced Carbon Dioxide and Methane Adsorption Enthalpy by Incorporation of Carbon Nanotubes", Inorganic Chemistry Communications, vol. 58, pp. 79-83, (Jun. 6, 2015).

Ben-Mansour, R., et al., "Carbon Capture by Physical Adsorption: Materials, Experimental Investigations and Numerical Modeling and Simulations—A Review", Applied Energy, vol. 161, pp. 225-255, (2016).

* cited by examiner

METHOD OF CAPTURING CARBON DIOXIDE

BACKGROUND OF THE INVENTION

Technical Field

The present invention relates to a method of capturing $CO_2$ with a $CO_2$ adsorbent that includes an adsorbent matrix of a zeolite and/or a metal organic framework and carbon nanotubes dispersed in the adsorbent matrix.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, environmental pollution is identified as one of the most significant issues with respect to environmental health and safety. The major concern is the formation of greenhouse gases, most importantly carbon dioxide, as a result of burning fossil fuels. Continuous release of carbon dioxide into the atmosphere causes global warming, shore floods, atmospheric heat waves, land droughts, and destruction of cold-marine life, which may directly or indirectly reduce world's gross domestic product by about 5 to 20% [Lee, S.-Y. and Park, S.-J., A review on solid adsorbents for carbon dioxide capture. Journal of Industrial and Engineering Chemistry, 2015, 23: p. 1-11]. The increase of the atmospheric temperature was measured to be about 0.74% in the last century and is predicted to reach to about 6.4% at the end of the current century [Lee, S.-Y. and Park, S.-J., A review on solid adsorbents for carbon dioxide capture. Journal of Industrial and Engineering Chemistry, 2015, 23: p. 1-11]. In view of that, a significant effort is dedicated to minimize and control $CO_2$ emissions into the atmosphere. A switch from fossil fuel energy to a pollution-free source of energy, e.g. renewable energy sources, does not appear to be practicable in a short period of time. Therefore, one possible solution to continue to use fossil fuel energy would be to minimize $CO_2$ emissions into the atmosphere by carbon capture and storage.

The on-going research in the field of Carbon Capture and Storage (CCS) is gaining momentum every day. A vast number of research studies involve $CO_2$ separation and storage, with the primary objective of developing novel adsorption materials or $CO_2$ adsorbents [Ben-Mansour, R., Habib, M. A., Bamidele, O. E., Basha, M., Qasem, N. A. A., Peedikakkal, A., Laoui, T., and Ali, M., Carbon capture by physical adsorption: Materials, experimental investigations and numerical modeling and simulations—A review, Applied Energy, 2016, 161: p. 225-255]. Also, a number of researchers have studied the processes of carbon dioxide capture e.g. pressure swing adsorption and temperature swing adsorption [Biswas, P., Agrawal, S., and Sinha, S., Modeling and simulation for pressure swing adsorption system for hydrogen purification. Chemical and Biochemical Engineering Quarterly, 2010, 24(4): p. 409-414; Casas, N., Schell, J., Pini, R., and Mazzotti, M., Fixed bed adsorption of $CO_2$/$H_2$ mixtures on activated carbon: experiments and modeling. Adsorption, 2012, 18(2): p. 143-161; Cavenati, S., Grande, C. A., and Rodrigues, A. E., Separation of mixtures by layered pressure swing adsorption for upgrade of natural gas, Chemical Engineering Science, 2006, 61(12): p. 3893-3906; Chaffee, A. L., Knowles, G. P., Liang, Z., Zhang, J., Xiao, P., and Webley, P. A., $CO_2$ capture by adsorption: Materials and process development, International Journal of Greenhouse Gas Control, 2007, 1(1): p. 11-18; Cho, S.-H., Park, J.-H., Beum, H.-T., Han, S.-S., and Kim, J.-N., A 2-stage PSA process for the recovery of $CO_2$ from flue gas and its power consumption in Carbon Dioxide Utilization for Global Sustainability, Proceedings of 7th the International Conference on Carbon Dioxide Utilization, 2004, Elsevier BV. p. 405-410; Choi, W.-K., Kwon, T.-I., Yeo, Y.-K., Lee, H., Song, H. K., and Na, B.-K., Optimal operation of the pressure swing adsorption (PSA) process for $CO_2$ recovery, Korean Journal of Chemical Engineering, 2003, 20(4): p. 617-623; Dantas, T. L., Amorim, S. M., Luna, F. M. T., Silva Jr, I. J., de Azevedo, D. C., Rodrigues, A. E., and Moreira, R. F., Adsorption of carbon dioxide onto activated carbon and nitrogen-enriched activated carbon: surface changes, equilibrium, and modeling of fixed-bed adsorption, Separation Science and Technology, 2009, 45(1): p. 73-84; Dantas, T. L. P., Luna, F. M. T., Silva, I. J., de Azevedo, D. C. S., Grande, C. A., Rodrigues, A. E., and Moreira, R. F. P. M., Carbon dioxide-nitrogen separation through adsorption on activated carbon in a fixed bed, Chemical Engineering Journal, 2011, 169(1-3): p. 11-19; Dantas, T. L. P., Luna, F. M. T., Silva, I. J., Torres, A. E. B., de Azevedo, D. C. S., Rodrigues, A. E., and Moreira, R. F. P. M., Carbon dioxide-nitrogen separation through pressure swing adsorption, Chemical Engineering Journal, 2011, 172 (2-3): p. 698-704; Gomes, V. G. and Yee, K. W. K., Pressure swing adsorption for carbon dioxide sequestration from exhaust gases, Separation and Purification Technology, 2002, 28(2): p. 161-171; Krishnamurthy, S., Rao, V. R., Guntuka, S., Sharratt, P., Haghpanah, R., Rajendran, A., Amanullah, M., Karimi, I. A., and Farooq, S., $CO_2$ capture from dry flue gas by vacuum swing adsorption: A pilot plant study, AIChE Journal, 2014, 60(5): p. 1830-1842; Lee, C.-H., Yang, J., and Ahn, H., Effects of carbon-to-zeolite ratio on layered bed $H_2$ PSA for coke oven gas, AIChE Journal, 1999, 45(3): p. 535-545; Park, J.-H., Kim, J.-N., and Cho, S.-H., Performance analysis of four-bed $H_2$ PSA process using layered beds, AIChE Journal, 2000, 46(4): p. 790-802; Wang, L., Liu, Z., Li, P., Yu, J., and Rodrigues, A. E., Experimental and modeling investigation on post-combustion carbon dioxide capture using zeolite 13X-APG by hybrid VTSA process, Chemical Engineering Journal, 2012, 197: p. 151-161; Wang, L., Yang, Y., Shen, W., Kong, X., Li, P., Yu, J., and Rodrigues, A. E., Experimental evaluation of adsorption technology for $CO_2$ capture from flue gas in an existing coal-fired power plant, Chemical Engineering Science, 2013, 101: p. 615-619]. In addition, some researchers have focused on developing adsorbent materials with enhanced $CO_2$ capture capacities and $CO_2$ selectivity. However, a relatively low thermal conductivity of the adsorbent materials has been shown to be a major drawback that restricts the adsorbent materials from having enhanced $CO_2$ capture capacities and $CO_2$ selectivity.

In view of the forgoing, one objective of the present disclosure is to provide a $CO_2$ adsorbent that includes MIL-100(Fe) and various amounts of carbon nanotubes that are dispersed therein. Another objective of the present disclosure provides a method of capturing $CO_2$ with a $CO_2$ adsorbent that includes an adsorbent matrix of a zeolite and/or a metal organic framework and carbon nanotubes that are dispersed within the adsorbent matrix.

BRIEF SUMMARY OF THE INVENTION

According to a first aspect, the present disclosure relates to a method of capturing $CO_2$, involving contacting a $CO_2$-containing stream with a $CO_2$ adsorbent to adsorb at least a portion of $CO_2$ from the $CO_2$-containing stream, wherein the $CO_2$ adsorbent comprises a) an adsorbent matrix comprising a zeolite and/or a metal organic framework, b) carbon nanotubes that are dispersed within the adsorbent matrix, wherein a weight percent of the carbon nanotubes in the $CO_2$ adsorbent is in the range of 0.01 wt % to 5.0 wt %, relative to the total weight of the $CO_2$ adsorbent.

In one embodiment, the $CO_2$-containing stream contains $CO_2$ and at least one gaseous substance selected from the group consisting of nitrogen, oxygen, argon, helium, water vapor, hydrogen, carbon monoxide, methane, and ethane. Accordingly, a volumetric ratio of $CO_2$ to the at least one gaseous substance is in the range of 1:50 to 5:1.

In one embodiment, the $CO_2$-containing stream is contacted with the $CO_2$ adsorbent at a temperature in the range of −20 to 100° C.

In one embodiment, the $CO_2$-containing stream is contacted with the $CO_2$ adsorbent at a pressure in the range of 0.5 to 10 bars.

In one embodiment, the method further involves degassing the $CO_2$ adsorbent in a sub-atmospheric pressure prior to the contacting.

In one embodiment, the $CO_2$ adsorbent is degassed in a temperature range of 10 to 400° C., for no more than 24 hours.

In one embodiment, the adsorbent matrix comprises a zeolite and a metal organic framework.

In one embodiment, the adsorbent matrix comprises the metal organic framework which is selected from the group consisting of Mg-MOF-74 and MIL-100(Fe).

In one embodiment, the adsorbent matrix comprises the zeolite which is zeolite 13X.

In one embodiment, the weight percent of the carbon nanotubes in the $CO_2$ adsorbent is in the range of 0.05 wt % to 1.5 wt %, relative to the total weight of the $CO_2$ adsorbent.

In one embodiment, the carbon nanotubes are single-walled carbon nanotubes.

In one embodiment, the carbon nanotubes are multi-walled carbon nanotubes.

In one embodiment, the carbon nanotubes are dispersed in the adsorbent matrix without forming chemical bonds with the adsorbent matrix.

In one embodiment, the carbon nanotubes are homogenously dispersed in the adsorbent matrix.

According to a second aspect, the present disclosure relates to a $CO_2$ adsorbent including i) an adsorbent matrix comprising MIL-100(Fe), ii) carbon nanotubes that are dispersed within the adsorbent matrix, wherein the carbon nanotubes are dispersed in the adsorbent matrix without forming chemical bonds with the adsorbent matrix.

In one embodiment, the $CO_2$ adsorbent has a $CO_2$ adsorption capacity in the range of 0.5 to 20 mmol $CO_2$ per one gram of the $CO_2$ adsorbent, at a temperature in the range of 10 to 40° C.

In one embodiment, the $CO_2$ adsorbent has a thermal conductivity of up to 500% higher than a thermal conductivity of a pristine adsorbent that comprises MIL-100(Fe) and does not include carbon nanotubes.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
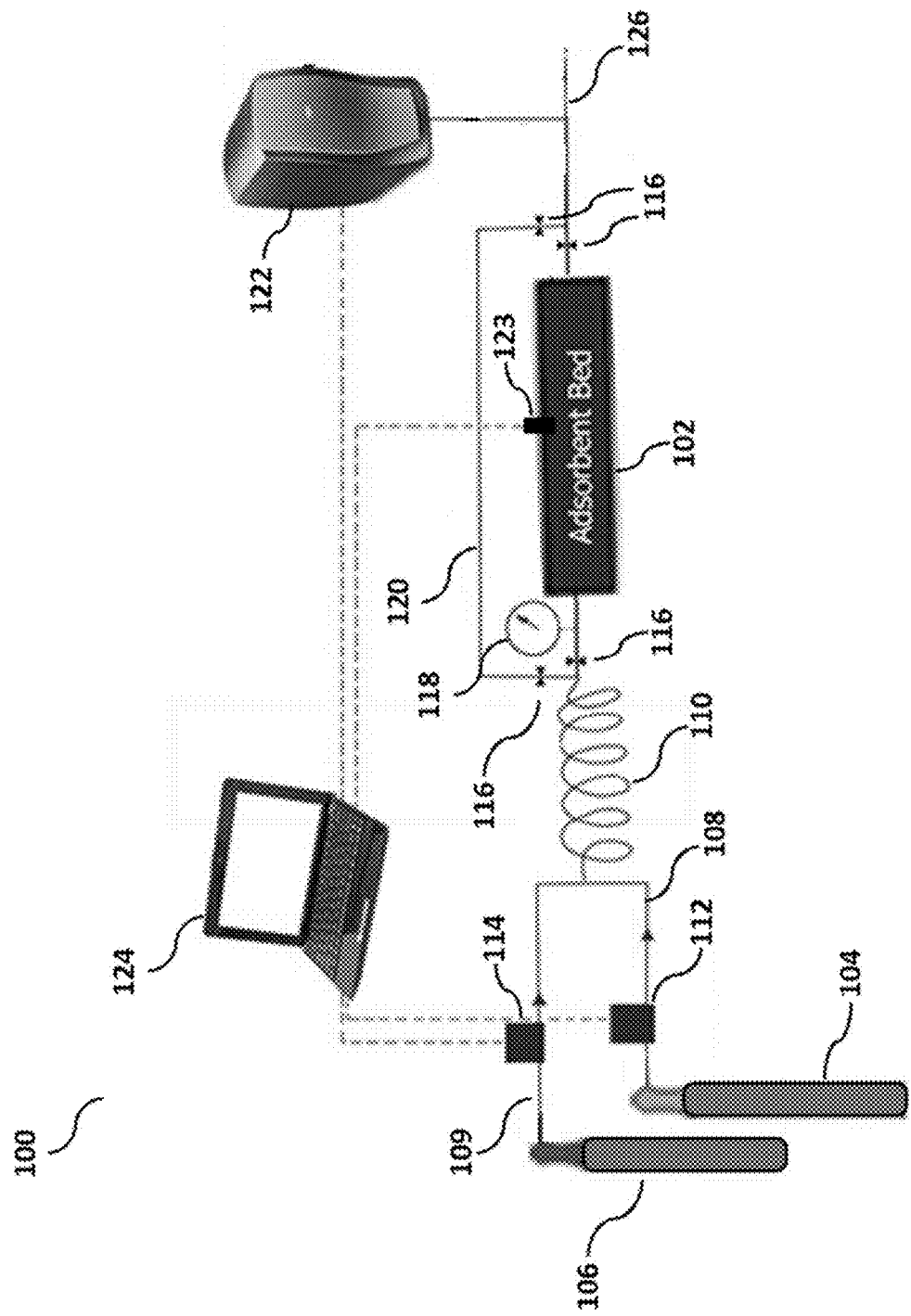
FIG. 1 is a schematic representation of a $CO_2$ capturing system.

Referring now to the drawings, wherein like reference numerals designate identical or corresponding parts throughout the several views.

According to a first aspect, the present disclosure relates to a method of capturing $CO_2$. The method involves contacting a $CO_2$-containing stream with a $CO_2$ adsorbent to adsorb at least a portion of $CO_2$ from the $CO_2$-containing stream, thereby forming a $CO_2$-depleted stream.

The term "$CO_2$-containing stream" as used in this disclosure refers to a gaseous stream that contains carbon dioxide ($CO_2$), and one or more gaseous substances including, but not limited to nitrogen, oxygen, argon, helium, water vapor, hydrogen, carbon monoxide, methane, ethane, hydrogen sulfide, nitrogen oxides (i.e. nitric oxide, nitrous oxide, nitrogen dioxide), or sulfur dioxide. Preferably, a volumetric concentration of the hydrogen sulfide, nitrogen oxides (i.e. nitric oxide, nitrous oxide, nitrogen dioxide), or sulfur dioxide, if present, is no more than 500 ppm, preferably no more than 100 ppm, and more preferably no more than 50 ppm, relative to the total volume of the $CO_2$-containing stream. In a preferred embodiment, a volumetric ratio of $CO_2$, which is present in the $CO_2$-containing stream, to the one or more gaseous substances present in the $CO_2$-containing stream is in the range of 1:50 to 5:1, preferably 1:45 to 4:1, preferably 1:40 to 3:1, preferably 1:35 to 2:1, preferably 1:30 to 1:1, preferably 1:25 to 1:2, preferably 1:20 to 1:3, preferably 1:15 to 1:4, preferably 1:10 to 1:5.

In some embodiments, the $CO_2$-containing stream is contacted with the $CO_2$ adsorbent at a temperature in the range of −20 to 100° C., preferably −10 to 80° C., preferably 0 to 60° C., preferably 10 to 40° C., preferably 20 to 30° C., preferably about 25° C. In addition, the $CO_2$-containing stream is contacted with the $CO_2$ adsorbent at a pressure in the range of 0.5 to 10 bars, preferably 0.6 to 8 bars, preferably 0.7 to 6 bars, preferably 0.8 to 4 bars, preferably 0.9 to 2 bars, preferably about 1 bar.

The $CO_2$-containing stream may be recovered (or may be directly supplied) from an upstream processing unit, e.g. a methanol producing unit, a steam power plant, a steam generator, a combustor, an oxy-fuel combustor, an ion transport membrane, etc. In view of that, in circumstances where the temperature or the pressure of the $CO_2$-containing stream falls outside of the above mentioned operating temperature and pressure ranges, the temperature and the pressure of the $CO_2$-containing stream may be adjusted to be within said operating temperature and pressure ranges prior to contacting the $CO_2$-containing stream with the $CO_2$ adsorbent.

The term "$CO_2$-depleted stream" as used herein refers to a gaseous stream that is formed after $CO_2$ is adsorbed onto the $CO_2$ adsorbent. A composition of the $CO_2$-depleted stream may vary depending on the composition of the $CO_2$-containing stream. In some embodiments, the $CO_2$-depleted stream includes $CO_2$ and one or more gaseous substances including, but not limited to nitrogen, oxygen, argon, helium, water vapor, hydrogen, carbon monoxide, methane, ethane, hydrogen sulfide, nitrogen oxides (i.e. nitric oxide, nitrous oxide, nitrogen dioxide), or sulfur dioxide. Accordingly, a volumetric ratio of $CO_2$, which is present in the $CO_2$-depleted stream, to the one or more gaseous substances may vary in the range of 1:100 to 1:1, preferably 1:98 to 1:5, preferably 1:95 to 1:10, preferably 1:90 to 1:15, preferably 1:85 to 1:20, preferably 1:80 to 1:25, preferably 1:75 to 1:30. In another preferred embodiment, the $CO_2$-depleted stream does not include $CO_2$. In another embodiment, the $CO_2$-depleted stream is substantially free of $CO_2$, and accordingly, it contains less than 100 ppm, preferably less than 10 ppm, preferably less than 1 ppm, preferably less than 1 ppb $CO_2$.

The $CO_2$-containing stream may be contacted with the $CO_2$ adsorbent by passing the $CO_2$-containing stream over the $CO_2$ adsorbent. Alternatively, the $CO_2$-containing stream may stay stagnant over the $CO_2$ adsorbent, i.e. as an atmosphere to the $CO_2$ adsorbent. Preferably, the $CO_2$-containing stream may be contacted by passing the $CO_2$-containing stream through the $CO_2$ adsorbent, for example, with a fixed-bed column. For example, in some embodiments, the $CO_2$-containing stream is contacted by passing the $CO_2$-containing stream through the $CO_2$ adsorbent present in a fixed-bed column. Accordingly, the $CO_2$-containing stream may have a pressure in the range of 0.5 to 10 bars, preferably 0.6 to 8 bars, preferably 0.7 to 6 bars, preferably 0.8 to 4 bars, preferably 0.9 to 2 bars, preferably about 1 bar. The $CO_2$-containing stream may have a temperature in the range of −20 to 100° C., preferably −10 to 80° C., preferably 0 to 60° C., preferably 10 to 40° C., preferably 20 to 30° C., preferably about 25° C. The $CO_2$-containing stream may have a flow rate in the range of 0.01 L/min to 100,000 L/min, preferably 0.1 L/min to 50,000 L/min, preferably 1.0 L/min to 10,000 L/min, preferably 10 L/min to 5,000 L/min, preferably 100 L/min to 1,000 L/min, preferably about 500 L/min. The $CO_2$-containing stream may have an hourly space velocity in the range of 0.1 to 10,000 $hr^{-1}$, preferably 1.0 to 1,000 $hr^{-1}$, preferably 10 to 800 $hr^{-1}$, preferably 50 to 500 $hr^{-1}$.

In one embodiment, the $CO_2$ adsorbent is thermally treated with an inert gas, e.g. nitrogen, helium, and/or argon, at a temperature in the range of 300 to 500° C., preferably 350 to 450° C., preferably about 400° C., for 1 to 6 hours, preferably about 2 to 3 hours, prior to contacting the $CO_2$-containing stream with the $CO_2$ adsorbent. This optionally preferred step of thermal treatment of the $CO_2$ adsorbent may evaporate residual water and/or decompose organic compounds present in the $CO_2$ adsorbent, and thus may open pores and increase a specific surface area of the $CO_2$ adsorbent.

In a preferred embodiment, the $CO_2$ adsorbent is degassed in a sub-atmospheric pressure of 0.05 to 0.9 atm, preferably 0.1 to 0.5 atm, prior to contacting the $CO_2$-containing stream with the $CO_2$ adsorbent. The $CO_2$ adsorbent may be degassed at a temperature in the range of 10 to 400° C., preferably 50 to 350° C., preferably 100 to 300° C., preferably 150 to 250° C., for no more than 24 hours, preferably no more than 12 hours, preferably 1 to 6 hours, preferably about 2 to 3 hours, prior to the contacting. In a preferred embodiment, the $CO_2$ adsorbent is degassed in different temperature ranges depending on a composition of the $CO_2$ adsorbent. For example, in some embodiments, the $CO_2$ adsorbent includes metal organic frameworks (MOFs), wherein the $CO_2$ adsorbent is degassed at a temperature of up to 250° C., preferably 50 to 220° C., preferably 100 to 210° C., preferably 150 to 200° C. Alternatively, in some other embodiments, the $CO_2$ adsorbent includes a zeolite and does not include metal organic frameworks (MOFs), wherein the $CO_2$ adsorbent is degassed at a temperature of up to 400° C., preferably 50 to 350° C., preferably 100 to 300° C., preferably 150 to 250° C.

After the contacting, in a preferred embodiment, the method of capturing $CO_2$ further involves heating the $CO_2$ adsorbent to a temperature in the range of 50 to 250° C., preferably 50 to 250° C., preferably 80 to 200° C., preferably 100 to 150° C., wherein a retained $CO_2$, i.e. $CO_2$ that is adsorbed onto the $CO_2$ adsorbent, is desorbed and is further collected as a $CO_2$ stream. Alternatively, the retained $CO_2$ may be desorbed by lowering an atmospheric pressure of the $CO_2$ adsorbent to a pressure in the range of 0.05 to 0.9 atm, preferably 0.1 to 0.5 atm. Yet in another embodiment, the retained $CO_2$ may be desorbed by flushing steam to cause the $CO_2$ adsorbent to desorb the retained $CO_2$. According to this embodiment, the $CO_2$ adsorbent may further be flushed by an air stream to remove residual steam from the $CO_2$ adsorbent.

The $CO_2$ stream includes $CO_2$ and may further include one or more gaseous substances including but not limited to, nitrogen, oxygen, argon, helium, water vapor, hydrogen, carbon monoxide, methane, ethane, hydrogen sulfide, nitrogen oxides (i.e. nitric oxide, nitrous oxide, nitrogen dioxide), or sulfur dioxide. Preferably, a volumetric ratio of $CO_2$ in the $CO_2$ stream to the one or more gaseous substances of the $CO_2$ stream may vary in the range of 200:1 to 1:1, preferably 150:1 to 5:1, preferably 100:1 to 10:1, preferably 95:1 to 15:1, preferably 90:1 to 20:1, preferably 85:1 to 25:1, preferably 80:1 to 30:1, preferably 75:1 to 35:1, preferably 70:1 to 40:1.

The $CO_2$ stream, which is preferably a substantially pure carbon dioxide stream, may further be injected into a geological formation, or the $CO_2$ stream may be captured by other means known to those skilled in the art. The $CO_2$ stream may also be utilized in supercritical extraction systems. Alternatively, the $CO_2$ stream may be utilized to dilute gaseous streams, or may be utilized in processes where a low/medium/high pressure $CO_2$ stream is demanded. For example, in one embodiment, the $CO_2$ stream may be mixed with a fuel or an oxygen stream before feeding into a combustor. In an alternative embodiment, the $CO_2$ stream may be mixed with an enriched-oxygen stream prior to delivering to an ion transport membrane.

The $CO_2$ adsorbent includes an adsorbent matrix comprising a zeolite and/or a metal organic framework (MOF). Preferably, the adsorbent matrix includes both the zeolite and the MOF, even though in some embodiments the adsorbent matrix may only have the zeolite or the MOF.

The adsorbent matrix may preferably include one or more metal organic frameworks (MOF) selected from Mg-MOF-74, MIL-100(Fe), MOF-5, MOF-177, MOF-199, or MOF-210. MOFs are highly porous, crystalline materials that are constructed from metal oxide and rigid organic molecular building blocks. The MOFs that are utilized herein may have a BET surface area of up to 10,000 m$^2$/g, preferably in the range of 1,000 to 5,000 m$^2$/g, more preferably 1,500 to 2,500 m$^2$/g. Also, the MOFs may have a specific pore volume of up to 3.0 cm$^3$/g, preferably in the range of 0.1 to 1.5 cm$^3$/g, more preferably 0.5 to 1.0 cm$^3$/g. A pore structure of the MOF may be modified at the molecular level by altering pore diameters, polarizability, and hydrophobicity of the MOF. Said modifications may result in an increase in a $CO_2$ adsorption capacity of the $CO_2$ adsorbent. In some alternative embodiments, the metal-organic framework includes [Me$_2$(4,4'-bipyridine)$_3$(NO$_3$)$_4$], wherein Me represents any one of Co, Ni, and Zn. The MOF may also include [Me$_2$(1, 4-benzenedicarboxylate anion)$_2$], wherein Me represents any one of Cu and Zn. Additionally, the MOF may include [Fe$_2$(trans-4,4'-azopyridone)$_4$(NCS)$_4$]. Alternatively, the metal-organic framework utilized in the $CO_2$ adsorbent may have a general formula of Me$_x$O(RC)$_y$, wherein Me is a transition metal, preferably Zn, Ni, Co, or Cu, and wherein each of x and y are independently a positive integer in the range of 1 to 8, preferably 3 to 5. Also, (RC) in the general formula represents any one of an aromatic carboxylate, an aromatic dicarboxylate, and anionic derivatives thereof including, for example, 1,4-benzenedicarboxylate anion, 2-bromo-1,4-benzenedicarboxylate anion, 2-amino-1,4-benzenedicarboxylate anion, 2,5-propyl-1,4-benzenedicarboxylate anion, 2,5-pentyl-1,4-benzenedicarboxylate anion, cyclobutene-1,4-benzenedicarboxylate anion, 1,4-naphthalenedicarboxylate anion, 2,6-naphthalenedicarboxylate anion, 4,4'-biphenyldicarboxylate anion, 4,5,9,10-tetrahydropyrene-2,7-dicarboxylate anion, pyrene-2,7-dicarboxylate anion, and 4,4'-terphenyldicarboxylate anion. The MOFs are preferably stable during operating conditions of capturing $CO_2$, in other words the MOFs preferably maintain a porous framework even when guest molecules are absent.

The adsorbent matrix may include a zeolite, in addition to or in lieu of the metal organic framework. The zeolite may preferably be selected from the group consisting of zeolite 13X, MCM-41, ZSM-5, ZSM-8, ZSM-11, ZSM-12, ZSM-18, ZSM-23, ZSM-35 and ZSM-39. In a preferred embodiment, the zeolite of the $CO_2$ adsorbent is zeolite 13X. Preferably, the zeolite of the $CO_2$ adsorbent may have a $SiO_2/Al_2O_3$ molar ratio in the range of 23-10,000, or preferably 100-2,000, or preferably 500-1,500.

Water molecules may also be present inside channels, channel intersections, and/or cage structures of the zeolite, however, thermally treating and/or degassing the $CO_2$ adsorbent may preferably remove at least 99 wt %, preferably at least 99.5 wt % of water, relative to the total weight of water present in the zeolite before thermally treating and/or degassing the $CO_2$ adsorbent.

The zeolite of the $CO_2$ adsorbent may be a 4-membered ring zeolite, a 6-membered ring zeolite, a 10-membered ring zeolite, and/or a 12-membered ring zeolite. Also, the zeolite may have a natrolite framework (e.g. gonnardite, natrolite, mesolite, paranatrolite, scolecite, and tetranatrolite), an edingtonite framework (e.g. edingtonite and kalborsite), a thomsonite framework, an analcime framework (e.g. analcime, leucite, pollucite, and wairakite), a phillipsite framework (e.g. harmotome), a gismondine framework (e.g. amicite, gismondine, garronite, and gobbinsite), a chabazite framework (e.g. chabazite-series, herschelite, willhendersonite, and SSZ-13), a faujasite framework (e.g. faujasite-series, Linde type X, and Linde type Y), a mordenite framework (e.g. maricopaite and mordenite), a heulandite framework (e.g. clinoptilolite and heulandite-series), a stilbite framework (e.g. barrerite, stellerite, and stilbite-series), a brewsterite framework, or a cowlesite framework.

In some embodiments, the zeolite of the $CO_2$ adsorbent includes micro-pores (i.e. pores with an average pore diameter of less than 2 nm, preferably in the range of 4-12 Å, more preferably 5-10 Å, even more preferably 6-8 Å) with a micro-pore specific surface area in the range of 10-50 m$^2$/g, preferably 20-40 m$^2$/g, and a micro-pore specific pore volume in the range of 0.01-0.3 cm$^3$/g, preferably 0.02-0.2 cm$^3$/g, more preferably 0.05-0.1 cm$^3$/g. The zeolite of the $CO_2$ adsorbent may further include meso-pores (i.e. pores with an average pore diameter in the range of 2-50 nm, preferably 5-20 nm) with a meso-pore specific pore volume in the range of 0.01-0.15 cm$^3$/g, preferably 0.05-0.12 cm$^3$/g, more preferably 0.08-0.1 cm$^3$/g, and a meso-pore specific surface area in the range of 20-80 m$^2$/g, preferably 30-70 m$^2$/g.

In one embodiment, at least one transition metal may also be present inside channels, channel intersections, and/or cage structures of the zeolite. The at least one transition metal may be selected from the elements of groups 6 to 12 of the periodic table, preferably including Cu, Ag, Au, V, Cr, Mo, W, Mn, Pt, Pd, Fe, Ni, Zn, Ga, and Re. Said transition metals may also be present in oxide forms in the zeolite. In one embodiment, the zeolite of the $CO_2$ adsorbent may be in a form of a pillared zeolite, wherein pillars (e.g. silica pillars) are located between two adjacent layers in the zeolite.

In one embodiment, a selectivity of the zeolite with respect to carbon dioxide relative to the gaseous substances, which may be present in the $CO_2$-containing stream, is at least 50%, preferably at least 60%, preferably at least 70%, preferably at least 80%, preferably at least 90%, preferably at least 95%, preferably at least 98%, preferably at least 99%. The term "selectivity" as used herein refers to a capability of a zeolite to separate carbon dioxide in the presence of the gaseous substances in the $CO_2$-containing stream. For example, the phrase "a selectivity of the zeolite with respect to carbon dioxide is at least 90%" refers to an embodiment, wherein 90% by mole of the total substances that are adsorbed onto the $CO_2$ adsorbent is carbon dioxide.

In a preferred embodiment, the adsorbent matrix includes the zeolite and the MOF, wherein a weight ratio of the zeolite to the MOF is in the range of 10:1 to 1:10, preferably 8:1 to 1:8, preferably 5:1 to 1:6, preferably 3:1 to 1:5, preferably 2:1 to 1:4, preferably 1:1 to 1:3, preferably 1:1.5 to 1:2.

Depending on the weight ratio of the zeolite to the MOF, a thermal conductivity of the adsorbent matrix may be in the range of 0.1 to 1.0 W/m·K, or 0.2 to 0.5 W/m·K, or 0.25 to 0.4 W/m·K. Said thermal conductivity ranges may be relatively low particularly for $CO_2$ capturing applications. Therefore, it may be preferable to incorporate a carbon material into the adsorbent matrix to increase the thermal conductivity of the $CO_2$ adsorbent. Exemplary carbon materials may include, but are not limited to carbon nanotubes, graphite flakes, activated carbon particles, graphene sheets, carbon fibers, and fullerenes. The carbon materials may increase an overall thermal conductivity of the $CO_2$ adsorbent by up to 500%, preferably up to 400%, preferably up to 300%, preferably up to 200%, preferably up to 100%, preferably about 10% to 80%, more preferably about 20% to 60%.

The $CO_2$ adsorbent further includes carbon nanotubes (CNTs) that are dispersed within the adsorbent matrix. A weight percent of the carbon nanotubes in the $CO_2$ adsorbent is in the range of 0.01 wt % to 5.0 wt %, preferably 0.02 wt % to 4.0 wt %, preferably 0.03 wt % to 3.0 wt %, preferably 0.04 wt % to 2.0 wt %, preferably 0.05 wt % to 1.8 wt %, preferably 0.1 wt % to 1.5 wt %, relative to the total weight of the $CO_2$ adsorbent.

In one embodiment, the carbon nanotubes are single-walled carbon nanotubes, with an average diameter in the range of 0.5 to 5 nm, preferably 1 to 4 nm, more preferably about 1.5 to 3 nm, and an aspect ratio (i.e. a ratio of length-to-diameter) of greater than or equal to about 500, preferably greater than or equal to about 1,000, more preferably greater than or equal to about 10,000. The single-walled carbon nanotubes may be closed structures having hemispherical caps at each end of respective tubes, or they may have a single open end or both open ends.

In a preferred embodiment, the carbon nanotubes are multi-walled carbon nanotubes, with an average diameter within the range of 5 to 40 nm, preferably 10 to 20 nm, more preferably about 12 to 18 nm, and an aspect ratio of greater than or equal to about 100, preferably greater than or equal to about 500, more preferably greater than or equal to about 1,000. The multi-walled carbon nanotubes may be closed structures having hemispherical caps at each end of respective tubes, or they may have a single open end or both open ends.

In some embodiments, the carbon nanotubes are dispersed in the adsorbent matrix without forming chemical bonds, e.g., covalent and/or ionic bonds, with the adsorbent matrix. Accordingly, pristine carbon nanotubes are preferably utilized in the process of fabricating the $CO_2$ adsorbent, without being treated with an acid (e.g. nitric acid). Therefore, oxidized functionalities (e.g. carboxylic acid functional groups) are preferably not present on the carbon nanotubes. The carbon nanotubes may be dispersed in the adsorbent matrix by known methods in the art such as, for example, sonication, ultra-sonication, centrifugation, roll-milling, etc. In view of that, in a preferred embodiment, the carbon nanotubes are homogenously dispersed in the adsorbent matrix. The term "carbon nanotubes are homogenously dispersed in the adsorbent matrix" as used herein refers to an embodiment, wherein a volumetric concentration of carbon nanotubes of any cubic-micron (1 µm$^3$) of the matrix is no more than 10%, preferably no more than 5%, preferably no more than 1% of the volumetric concentration of carbon nanotubes of another cubic-micron (1 µm$^3$) of the matrix.

In another embodiment, the $CO_2$ adsorbent further includes exfoliated graphite flakes to increase the thermal conductivity of the $CO_2$ adsorbent. The exfoliated graphite flakes may be obtained by mechanical methods known in the art, e.g. roll-milling, or microwave expansion. The exfoliated graphite flakes may preferably not be functionalized, and thus the graphite flakes do not form chemical bonds with the adsorbent matrix. The exfoliated graphite flakes may be present in an amount of no more than 1.0% by volume, preferably no more than 0.5% by volume, relative to the total volume of the $CO_2$ adsorbent. The presence of the exfoliated graphite flakes may increase the thermal conductivity of the $CO_2$ adsorbent by at least 50%, preferably by about 80% to about 150%, preferably by about 100% to about 120%, which may be obtained from percolation of the exfoliated graphite flakes.

In some embodiments, the thermal conductivity of the $CO_2$ adsorbent is in the range from about 0.001 to about 50 W/m·K, preferably from about 0.005 to about 40 W/m·K, preferably from about 0.01 to about 30 W/m·K, preferably from about 0.05 to about 20 W/m·K, preferably from about 0.1 to about 10 W/m·K.

A $CO_2$ adsorption capacity of the $CO_2$ adsorbent may be improved by adding carbon nanotubes, and preferably exfoliated graphite flakes. Accordingly, in some embodiments, the $CO_2$ adsorbent has 0.01 wt % to 5.0 wt %, preferably 0.1 wt % to 1.5 wt % of carbon nanotubes, wherein a $CO_2$ adsorption capacity of the $CO_2$ adsorbent is in the range of 0.5 to 20 mmol/g (millimole $CO_2$ per one gram of the $CO_2$ adsorbent), preferably 1.0 to 18 mmol/g, preferably 2.0 to 15 mmol/g, preferably 3.0 to 12 mmol/g, preferably 4.0 to 10 mmol/g, at a temperature in the range of 10 to 40° C., preferably 15 to 30° C., preferably 22 to 28° C. In another embodiment, the $CO_2$ adsorption capacity of the $CO_2$ adsorbent with carbon nanotubes is up to 20%, preferably 10% to 20%, preferably 12% to 18%, higher than the $CO_2$ adsorption capacity of a pristine adsorbent that does not include carbon nanotubes.

In addition, a $CO_2$ mass diffusivity (i.e. a coefficient of molecular diffusion of $CO_2$ through the $CO_2$ adsorbent) of the $CO_2$ adsorbent may improve by adding carbon nanotubes. For example, in one embodiment, the $CO_2$ mass diffusivity of the $CO_2$ adsorbent may be at least 50%, preferably at least 100%, preferably 150% to 400%, preferably 200% to 300% higher than the $CO_2$ mass diffusivity of a pristine adsorbent that does not include carbon nanotubes. An increase in the $CO_2$ mass diffusivity may speed up the adsorption/desorption processes of $CO_2$. A $CO_2$ mass diffusivity of the $CO_2$ adsorbent may be in the range of $10^{-9}$ to $5.0 \times 10^{-5}$ cm$^2$/s, preferably $10^{-9}$ to $5.0 \times 10^{-5}$ cm$^2$/s, preferably $5 \times 10^{-8}$ to $6.0 \times 10^{-5}$ cm$^2$/s, preferably $10^{-8}$ to $8.0 \times 10^{-5}$ cm$^2$/s, preferably $5 \times 10^{-7}$ to $10^{-6}$ cm$^2$/s, at a temperature in the range of 10 to 40° C., preferably 15 to 30° C., preferably 22 to 28° C.

In one embodiment, the $CO_2$ adsorbent further includes an organic binder such as melamine and/or hydroxyethyl-cellulose to improve the $CO_2$ mass diffusivity of the $CO_2$ adsorbent. Additionally, the organic binders may enhance a binding strength between components of the $CO_2$ adsorbent, i.e. the MOF, the zeolite, and the carbon nanotubes.

In some embodiments, the $CO_2$ adsorbent further includes one or more active compounds to enhance the $CO_2$ adsorption capacity of the $CO_2$ adsorbent. Exemplary active compounds may include, but are not limited to desiccant particles, activated alumina particles, molecular sieves, aluminophosphate particles, silicoaluminophosphate particles, ion exchanged zeolite particles, faujasite particles, clinoptilolite particles, mordenite particles, metal-exchanged silico-aluminophosphate particles, an aromatic cross-linked polystyrenic matrix, a brominated aromatic matrix, a methacrylic ester copolymer, carbon fibers, a metal salt adsorbent, a perchlorate, an oxalate, an alkaline earth metal particle, a metal oxide, a chemisorbent, an amine, an organometallic compound, or combinations thereof. In some other embodiments, the $CO_2$ adsorbent further includes one or more inactive compounds including, for example, clay, silica, a ceramic, an adhesive, or combinations thereof.

In some embodiments, the $CO_2$ adsorbent preferably includes micro-pores (i.e. pores with an average pore diameter of less than 2 nm, preferably in the range of 4-12 Å, more preferably 5-10 Å, even more preferably 6-8 Å) with a micro-pore specific pore volume in the range of 0.01-0.15 $cm^3/g$, preferably 0.05-0.12 $cm^3/g$, more preferably 0.08-0.1 $cm^3/g$, and a micro-pore specific surface area in the range of 10-500 $m^2/g$, preferably 100-400 $m^2/g$, more preferably 200-350 $m^2/g$. The $CO_2$ adsorbent may further include meso-pores (i.e. pores with an average pore diameter in the range of 2-50 nm, preferably 5-20 nm) with a meso-pore specific pore volume in the range of 0.1-0.5 $cm^3/g$, preferably 0.15-0.45 $cm^3/g$, more preferably 0.2-0.4 $cm^3/g$, and a meso-pore specific surface area in the range of 200-800 $m^2/g$, preferably 300-700 $m^2/g$. Also, the $CO_2$ adsorbent may further include macro-pores (i.e. pores with an average pore diameter of greater than 50 nm, preferably in the range of 40 to 100 nm, preferably 50 to 90 nm) with a macro-pore specific pore volume in the range of 0.2-1.0 $cm^3/g$, preferably 0.5-0.8 $cm^3/g$, and a macro-pore specific surface area in the range of 500-1,200 $m^2/g$, preferably 600-1,000 $m^2/g$, more preferably 700-900 $m^2/g$. In view of that, the $CO_2$ adsorbent may preferably have an average pore size in the range of 1 to 100 nm, preferably 5 to 80 nm, preferably 10 to 70 nm.

According to a second aspect, the present disclosure relates to a $CO_2$ adsorbent that includes an adsorbent matrix comprising MIL-100(Fe) and carbon nanotubes, wherein the carbon nanotubes are dispersed in the adsorbent matrix without forming chemical bonds with the adsorbent matrix.

Preferably, the adsorbent matrix only includes MIL-100 (Fe). Yet in some alternative embodiments, the adsorbent matrix includes MIL-100(Fe) and one or more zeolites selected from zeolite 13X, MCM-41, ZSM-5, ZSM-8, ZSM-11, ZSM-12, ZSM-18, ZSM-23, ZSM-35 and ZSM-39. Accordingly, a weight ratio of the zeolite(s) to the MIL-100 (Fe) is in the range of 1:1 to 1:10, preferably 1:2 to 1:9, preferably 1:3 to 1:8, preferably 1:4 to 1:6. In a preferred embodiment, a weight percent of the carbon nanotubes in the $CO_2$ adsorbent is in the range of 0.01 wt % to 2.0 wt %, preferably 0.02 wt % to 1.5 wt %, preferably 0.03 wt % to 1.0 wt %, preferably 0.04 wt % to 0.5 wt %, preferably 0.05 wt % to 0.4 wt %, preferably 0.08 wt % to 0.2 wt %, preferably about 0.1 wt %, relative to the total weight of the $CO_2$ adsorbent.

Depending on the composition, the $CO_2$ adsorbent may exhibit different thermal conductivities, different $CO_2$ mass diffusivities, and different $CO_2$ adsorption capacity. For example, in some preferred embodiments, the adsorbent matrix consists of MIL-100(Fe) and carbon nanotubes, wherein the carbon nanotubes are physical dispersed without forming chemical bonds with the MIL-100(Fe), and wherein a weight percent of the carbon nanotubes varies in the range between 0.05 wt % to 0.4 wt %, preferably 0.08 wt % to 0.2 wt %, preferably about 0.1 wt %, relative to the total weight of the $CO_2$ adsorbent. In view of that, the $CO_2$ adsorption capacity of the $CO_2$ adsorbent may preferably be in the range of 0.5 to 10 mmol/g, preferably 1.0 to 9.0 mmol/g, at a temperature in the range of 10 to 40° C., preferably 15 to 30° C., preferably 22 to 28° C. Furthermore, the $CO_2$ mass diffusivity of the $CO_2$ adsorbent may be in the range of $10^{-9}$ to $5.0 \times 10^{-5}$ $cm^2/s$, preferably $10^{-9}$ to $5.0 \times 10^{-5}$ $cm^2/s$, preferably $5 \times 10^{-8}$ to $6.0 \times 10^{-5}$ $cm^2/s$, preferably $10^{-8}$ to $8.0 \times 10^{-5}$ $cm^2/s$, preferably $5 \times 10^{-7}$ to $10^{-6}$ $cm^2/s$, at a temperature in the range of 10 to 40° C., preferably 15 to 30° C., preferably 22 to 28° C. Also, the thermal conductivity of the $CO_2$ adsorbent is in the range from about 0.001 to about 50 W/m·K, preferably from about 0.005 to about 40 W/m·K, preferably from about 0.01 to about 30 W/m·K, preferably from about 0.05 to about 20 W/m·K, preferably from about 0.1 to about 10 W/m·K.

Referring to FIG. 1, another aspect of the present disclosure relates to a $CO_2$ capturing system 100, and the method may involve capturing $CO_2$ with the system. In some embodiments, the $CO_2$ capturing system 100 includes an adsorbent bed 102, and a first supplier 104 that is fluidly connected to the adsorbent bed 102 via a first supplier line 108 and a feed line 110. Preferably, the first supplier 104 supplies a $CO_2$-containing stream to the adsorbent bed 102. In another embodiment, a second supplier 106 is fluidly connected to the adsorbent bed 102 via a second supplier line 109 and the feed line 110. Preferably, the second supplier 106 supplies a diluent gaseous stream, e.g. nitrogen, helium, argon, etc. to be mixed with the $CO_2$-containing stream prior to feeding the $CO_2$-containing stream to the adsorbent bed 102 via the feed line 110. The adsorbent bed may preferably be a horizontally-oriented (as shown in FIG. 1) or a vertically-oriented (not shown) vessel packed with the $CO_2$ adsorbent.

In some embodiments, the $CO_2$ capturing system 100 further includes a first actuator 112 and a processing unit 124 that communicates with a compositional analyzer 123, which is disposed in the adsorption bed 102, and/or a mass spectrometer 122, which is fluidly connected to a $CO_2$ line 126 downstream of the adsorbent bed. The $CO_2$ capturing system 100 further includes a second actuator 114 that communicates with the compositional analyzer 123 and/or the mass spectrometer 122 via the processing unit 124. Accordingly, changes in the composition of a $CO_2$-depleted stream or a $CO_2$ stream that flow inside the $CO_2$ line 126, and also changes in the composition of a gaseous stream inside the adsorbent bed 102 is preferably instantaneously monitored. Therefore, any variations in the composition of the $CO_2$-depleted stream or the $CO_2$ stream may be adjusted by regulating a flow rate of the $CO_2$-containing stream with the first actuator 112. Similarly, any variations in the composition of the gaseous stream may be adjusted by regulating a flow rate of the diluent gaseous stream with the second actuator 114. The $CO_2$ capturing system 100 may further include a flowmeter 118 disposed in the feed line 110, a bypass line 120, and a plurality of valves 116 disposed in the feed line 110, the $CO_2$ line 126, and the bypass line 120. Said lines, valves, actuators, suppliers, the flowmeter, the processing unit, the mass spectrometer, and the adsorbent bed utilized in the $CO_2$ capturing system are not meant to be limiting, and various lines, valves, actuators, suppliers, flowmeters, processing units, mass spectrometers, and adsorbent beds may also be used.

One aspect of the present disclosure relates to a method of fabricating the $CO_2$ adsorbent, which is described in the second aspect. The method may involve two or more steps, wherein MIL-100(Fe) is produced in a first step, followed by forming the $CO_2$ adsorbent in a second step. According to the first step, a predetermined amount of a ferric nitrate, preferably a hydrated ferric nitrate (e.g. $Fe(NO_3)_3 \cdot xH_2O$, with x in the range of 1 to 12, preferably 8 to 10) is mixed with water, preferably de-ionized water, and an aromatic carboxylate (e.g. benzenetricarboxylic acid) to form a first mixture. The first mixture is hydrothermally treated in an autoclave at a temperature in the range of 140 to 220° C., preferably 160 to 200° C., and a pressure in the range of 1 to 6 bars, preferably 2 to 4 bars, for no more than 24 hours, preferably 10 to 18 hours, preferably about 15 hours, wherein the MIL-100(Fe) and/or MIL-100(Fe) nuclei are formed in the autoclave. The MIL-100(Fe) and/or MIL-100 (Fe) nuclei may further be separated by centrifugation (or other known methods in the art), and may be washed with water and/or an organic solvent, e.g. acetone, methanol, or toluene. According to the second step, a predetermined amount of the MIL-100(Fe) and/or MIL-100(Fe) nuclei is mixed with the ferric nitrate, preferably a hydrated ferric nitrate (e.g. $Fe(NO_3)_3 \cdot xH_2O$, with x in the range of 1 to 12, preferably 8 to 10), water, preferably de-ionized water, the aromatic carboxylate (e.g. benzenetricarboxylic acid), and carbon nanotubes to form a second mixture. The second mixture may be centrifuged and/or sonicated for 2 to 12 hours, preferably 4 to 10 hours, and further be hydrothermally treated in an autoclave at a temperature in the range of 140 to 220° C., preferably 160 to 200° C., and a pressure in the range of 1 to 6 bars, preferably 2 to 4 bars, for no more than 24 hours, preferably 10 to 18 hours, preferably about 15 hours, wherein the $CO_2$ adsorbent is formed that includes MIL-100(Fe) and carbon nanotubes that are dispersed therein. The $CO_2$ adsorbent may further be separated by centrifugation (or other known methods in the art), and may be washed with water and/or an organic solvent, e.g. acetone, methanol, or toluene. In some embodiments, exfoliated graphite flakes are also mixed with the second mixture.

The examples below are intended to further illustrate protocols for the $CO_2$ adsorbents and the method of capturing $CO_2$ with the $CO_2$ adsorbents, and are not intended to limit the scope of the claims.

Example 1

The present disclosure considers physical incorporation of carbon nanotubes (CNTs) in different adsorbent materials (such as carbon-based adsorbents, zeolites, and metal organic frameworks (MOFs)) to provide a $CO_2$ adsorbent with a large $CO_2$ adsorption capacity. Since CNTs are known to have very high thermal conductivity (up to 3000 W/m·K), incorporating them with adsorbents such as Zeolites and/or MOFs may provide a new material composition with higher thermal conductivity than the pristine adsorbents. The following examples provide characterization of different $CO_2$ adsorbents that include zeolite 13X, Mg-MOF-74, and/or MIL-100(Fe) with various amount of carbon nanotubes.

Example 2—X-Ray Powder Diffraction Analysis

Figure 2:
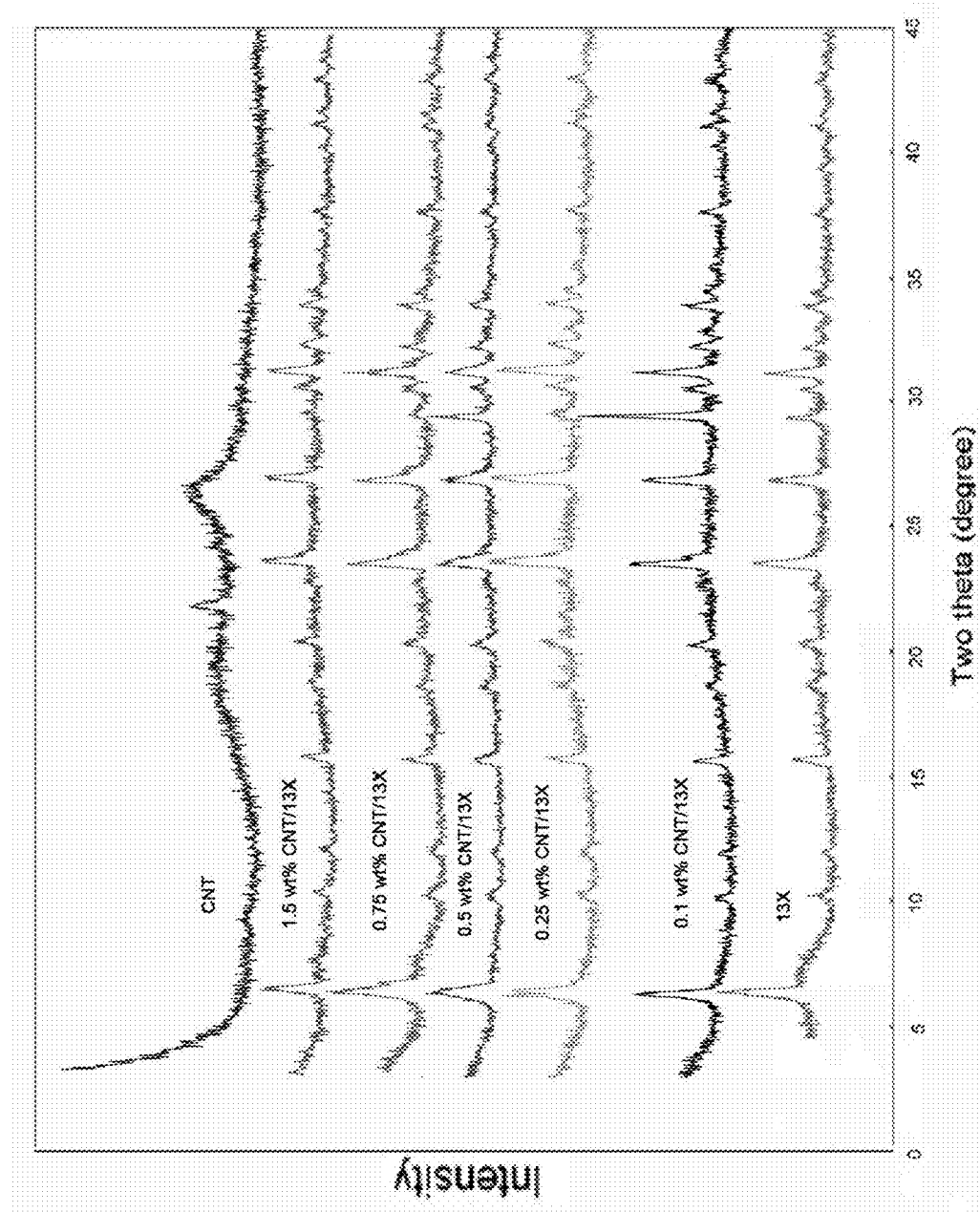
FIG. 2 represents X-ray diffraction spectra of $CO_2$ adsorbents having zeolite 13X and various amounts of carbon nanotubes.
Figure 6:
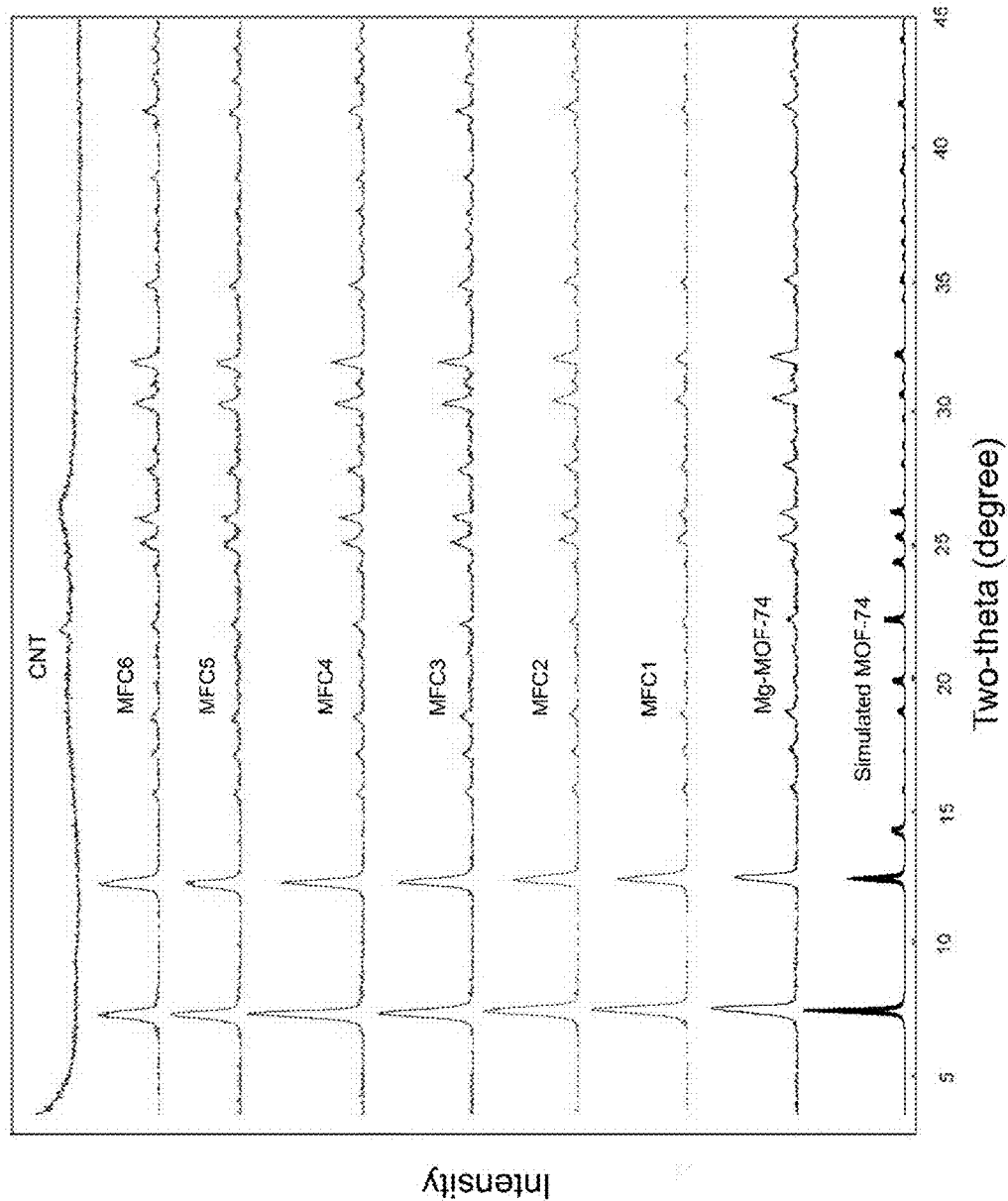
FIG. 6 represents X-ray diffraction spectra of $CO_2$ adsorbents having Mg-MOF-74 and various amounts of carbon nanotubes.

Powder X-Ray diffraction patterns for MWCNT/Mg-MOF-74 and CNT/13X were obtained and collected using a Bruker D8-Advance Diffractometer (Cu $K_\alpha$ $\lambda$=1.54056 Å) with an operating power of 30 kV/30 mA. The data were recorded by the step-counting method (step=0.02°, time=3 s) in the range 2θ=3-45° at ambient temperature of 298 K. FIG. 2 represents X-ray diffraction spectra of $CO_2$ adsorbents having zeolite 13X and various amounts of carbon nanotubes (i.e. CNT/13X). Also, FIG. 6 represents X-ray diffraction spectra of $CO_2$ adsorbents having Mg-MOF-74 and various amounts of carbon nanotubes (i.e. MWCNT/Mg-MOF-74). According to these figures, a substantial change is observed in the XRD spectra of the $CO_2$ adsorbents after adding carbon nanotubes. As evident from FIG. 6, the incorporation of CNTs does not result in a noticeable peak shift or a decrease in the crystallinity of the framework, as all the characteristic peaks representative of the Mg-MOF-74 structure can also be observed in the patterns shown for the CNT/Mg-MOF-74 adsorbents.

Example 3—Gas Sorption Measurements

Figure 3:
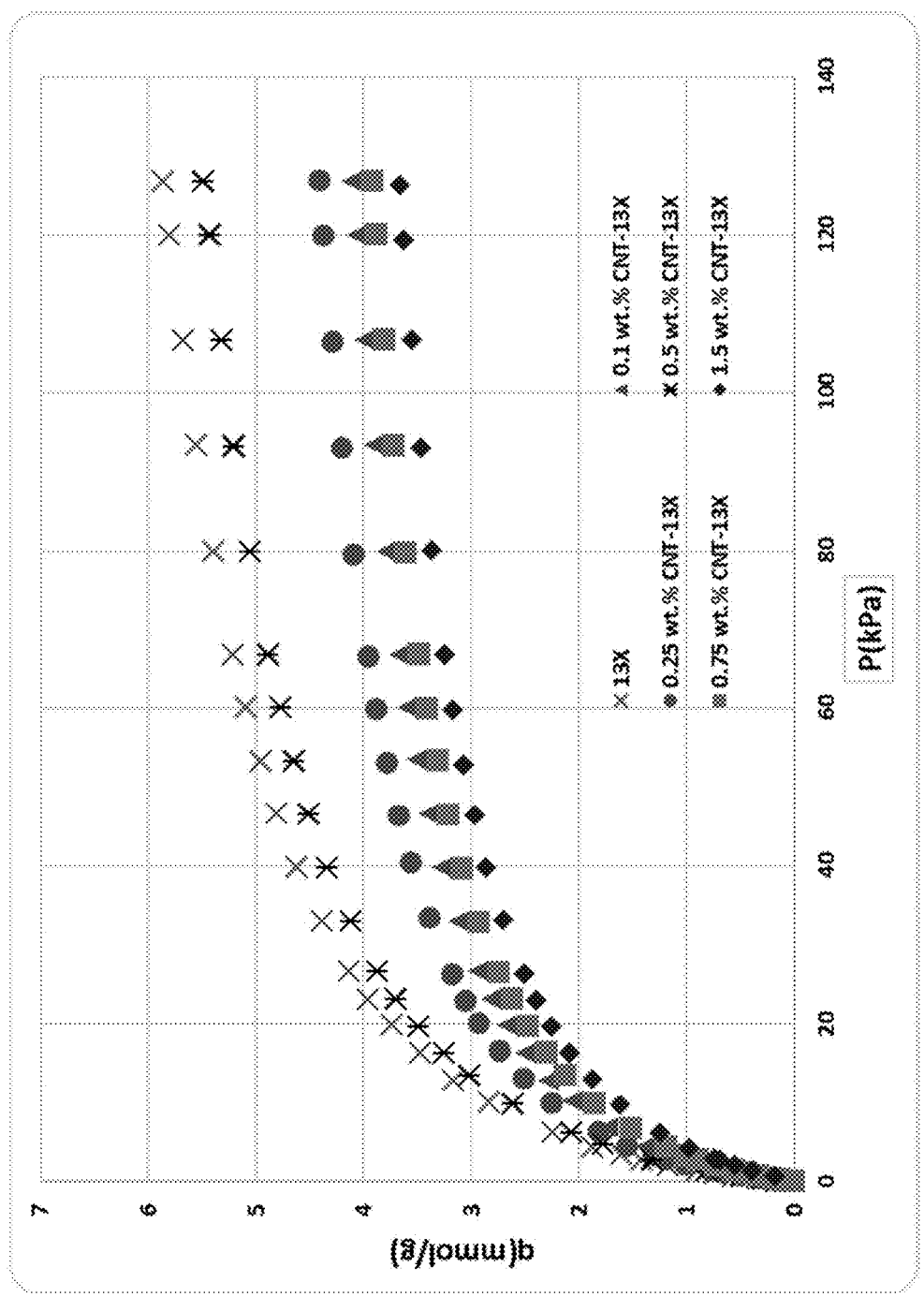
FIG. 3 represents $CO_2$ adsorption isotherms of $CO_2$ adsorbents having zeolite 13X and various amounts of carbon nanotubes, at a temperature of 25° C.
Figure 7:
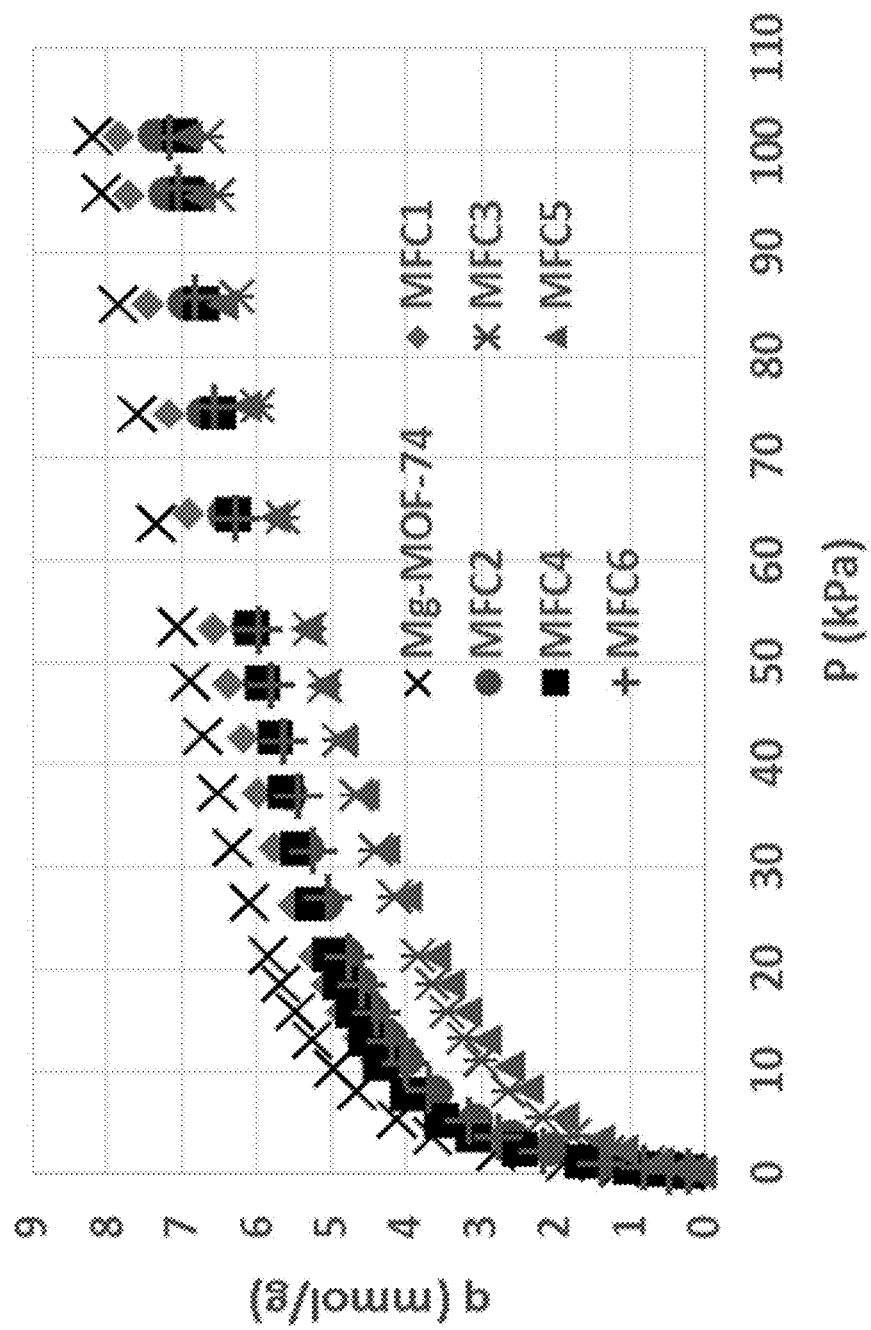
FIG. 7 represents $CO_2$ adsorption isotherms of $CO_2$ adsorbents having Mg-MOF-74 and various amounts of carbon nanotubes, at a temperature of 25° C.
Figure 10:
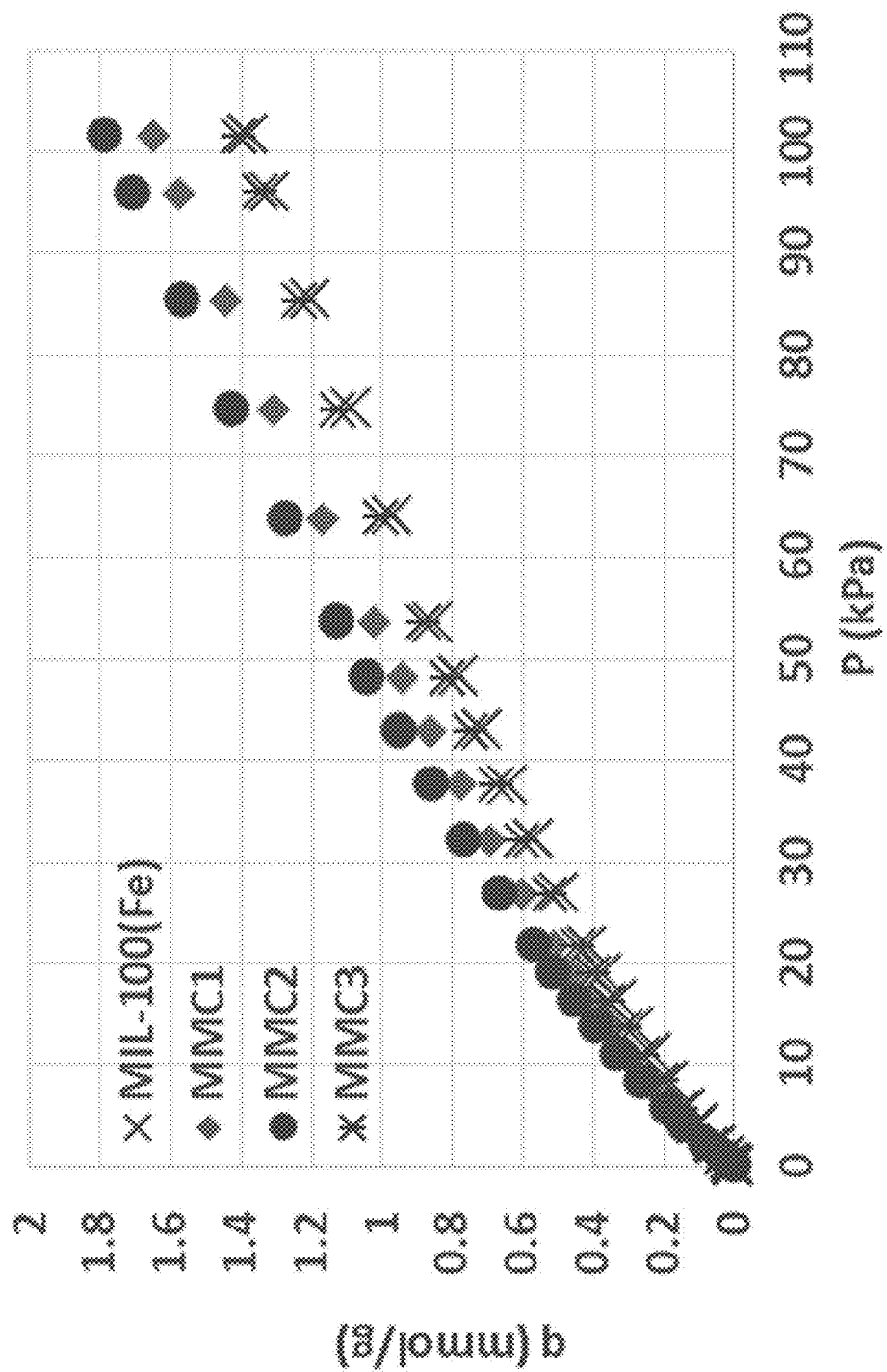
FIG. 10 represents $CO_2$ adsorption isotherms of $CO_2$ adsorbents having MIL-100(Fe) and various amounts of carbon nanotubes, at a temperature of 25° C.

The first step in the physisorption measurements of $CO_2$ is the sample degassing in order to remove any guest molecules within the pores of each material. Typically, 50-200 mg of each sample was transferred to pre-weighed empty sample cell with a 9 mm diameter. Degassing was conducted at 150° C. under vacuum for about 17 hours for MWCNT/MIL-100(Fe) adsorbents, 220° C. under vacuum during about 5 hours for MWCNT/Mg-MOF-74 adsorbents, and 250° C. under vacuum during 20 hours for CNT/13X adsorbents using an Autosorb degasser equipped with a turbo molecular vacuum pump and controlled heat jackets (Quantachrome Instruments, Inc.). The equilibrium adsorption isotherms for $CO_2$ have been measured at 298 K. Accordingly, FIG. 3 represents $CO_2$ adsorption isotherms of $CO_2$ adsorbents having zeolite 13X and various amounts of carbon nanotubes, at 298 K. FIG. 7 represents $CO_2$ adsorption isotherms of $CO_2$ adsorbents having Mg-MOF-74 and various amounts of carbon nanotubes, at 298 K. Also, FIG. 10 represents $CO_2$ adsorption isotherms of $CO_2$ adsorbents having MIL-100(Fe) and various amounts of carbon nanotubes, at 298 K.

Example 4—Binary Gas ($CO_2$+$N_2$) Breakthrough Experiments

The gas separation capabilities of all the samples were examined using a developed dynamic $CO_2/N_2$ breakthrough setup. The system consists of a fixed adsorbent bed column filled with compounds, feed $CO_2$ and $N_2$ cylinders (for simulating a flue gas). The system included two gas regulators with dual pressure gauges and output control valves, two mass flow controllers (one was calibrated for $CO_2$ flow and the other was calibrated for $N_2$), two check valves (to control the flow in one direction) and a bypass line (for calibrating the mass spectrometer from the feed gas mixture). The system also comprised a bourdon absolute pressure, a mass spectrometer (to analyze the output concentration of effluent gases from the bed), heater jacket and vacuum pump (for desorption process to regenerate the adsorbent) and some valves and tubes to control the flow. All pipes and fittings were made of stainless steel to keep off corrosion contaminants. All tests have been carried out at ambient conditions (297 K and 101.3 kPa). The $CO_2$ inlet partial pressure was 20% of an inlet $CO_2/N_2$ mixture (101.3 kPa) for CNT/13X and CNT/Mg-MOF-74 samples, while that was 15% for CNT/MIL-100(Fe).

Figure 4:
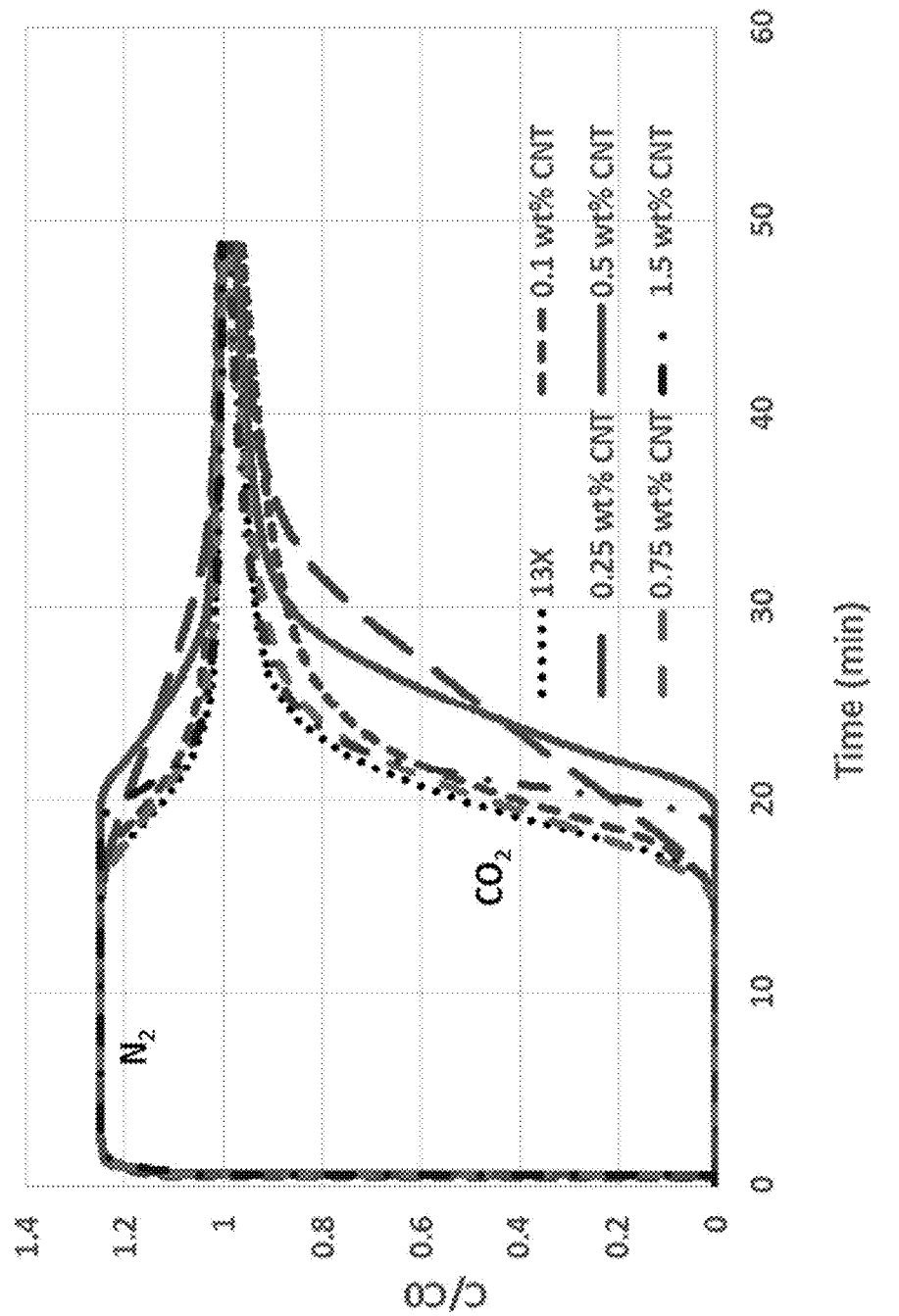
FIG. 4 represents breakthrough curves of $CO_2$ adsorbents having zeolite 13X and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:4, is contacted with the $CO_2$ adsorbents.
Figure 8:
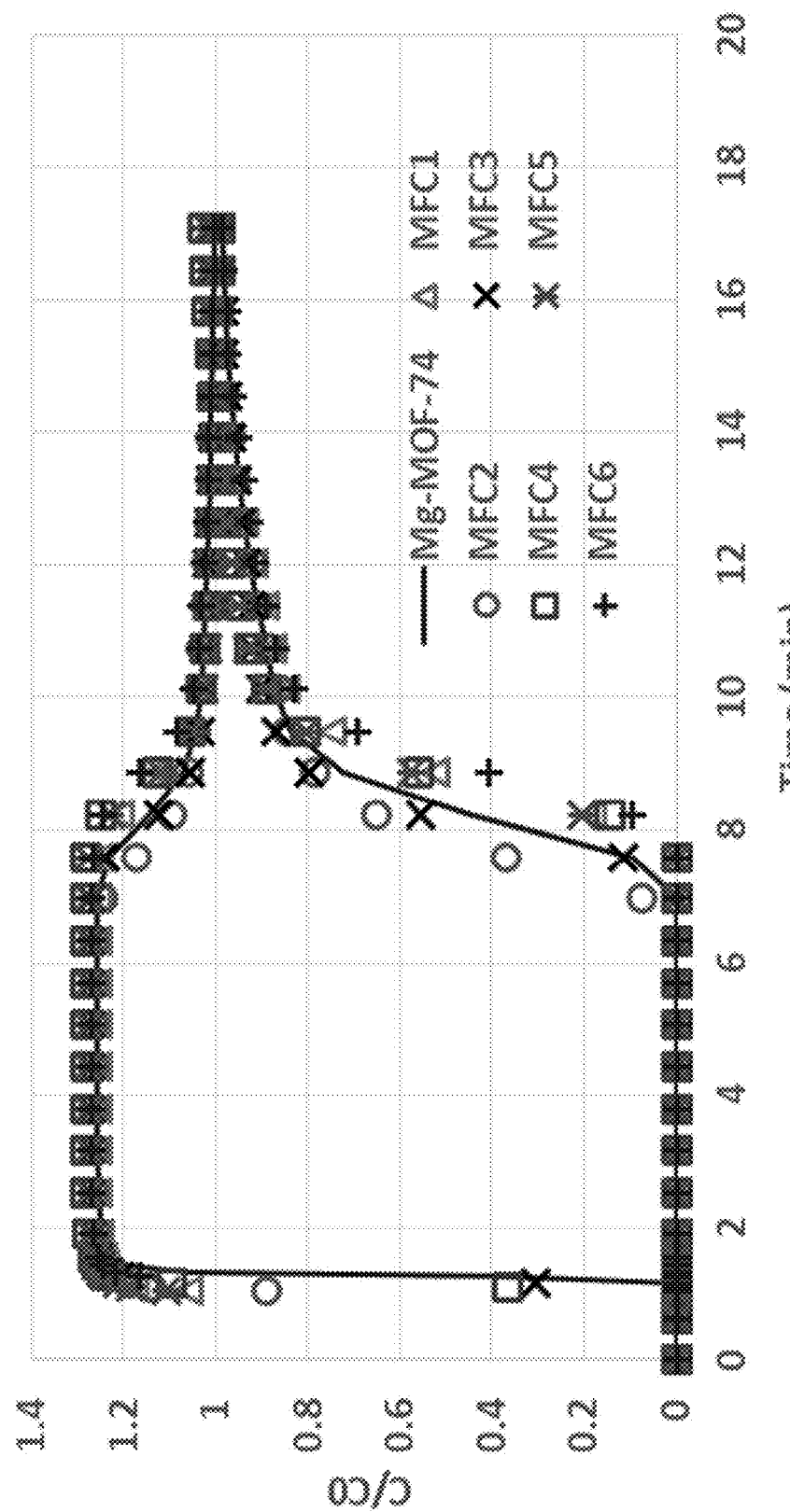
FIG. 8 represents breakthrough curves of $CO_2$ adsorbents having Mg-MOF-74 and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:4, is contacted with the $CO_2$ adsorbents.
Figure 11:
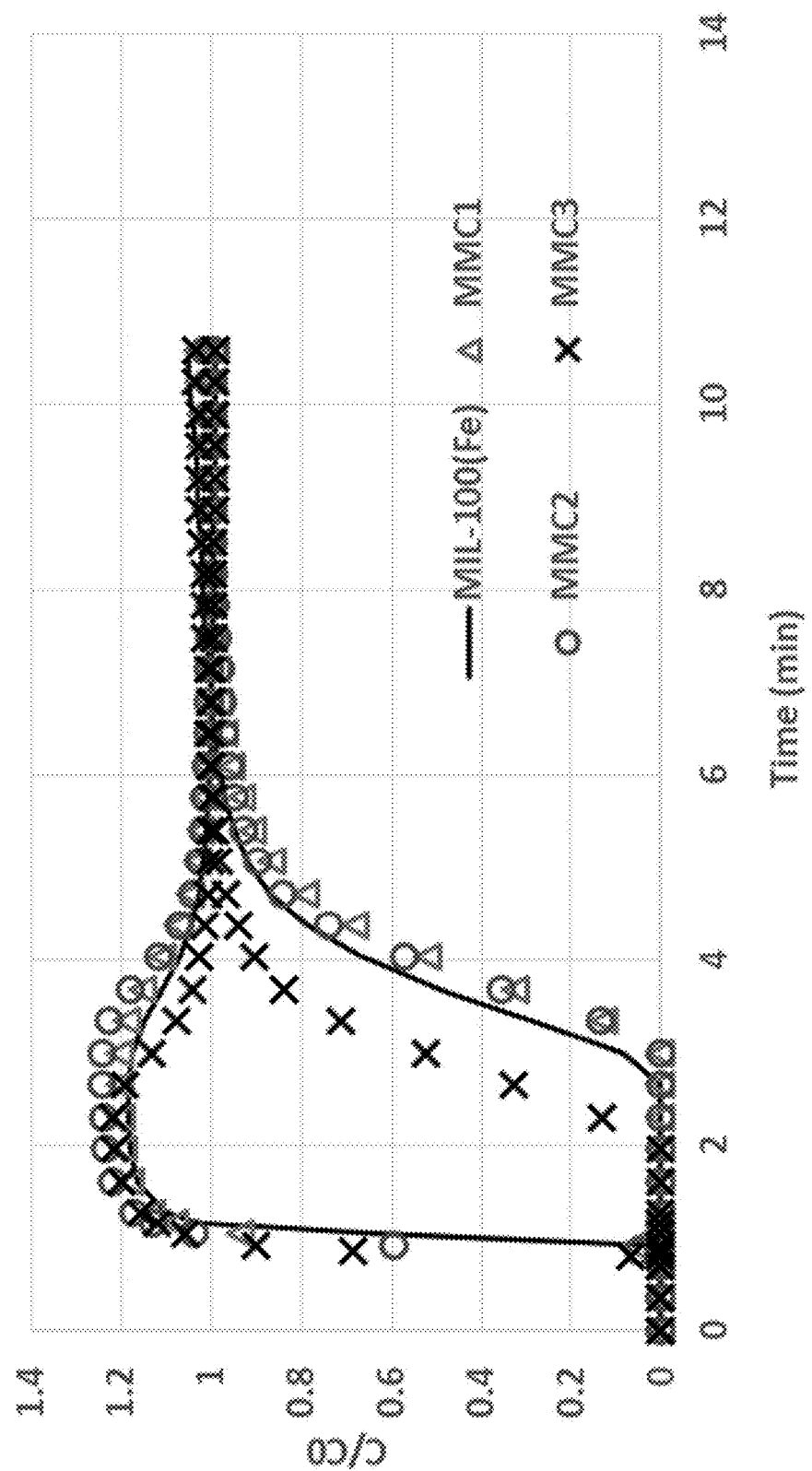
FIG. 11 represents breakthrough curves of $CO_2$ adsorbents having MIL-100(Fe) and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:5.6, is contacted with the $CO_2$ adsorbents.

The $CO_2$ adsorption of the $CO_2$ adsorbents are presented by breakthrough curves of $CO_2/N_2$ separation as shown in FIG. 4, FIG. 8, and FIG. 11. FIG. 4 represents breakthrough curves of $CO_2$ adsorbents having zeolite 13X and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:4, is contacted with the $CO_2$ adsorbents. FIG. 8 represents breakthrough curves of $CO_2$ adsorbents having Mg-MOF-74 and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:4, is contacted with the $CO_2$ adsorbents. Also, FIG. 11 represents breakthrough curves of $CO_2$ adsorbents having MIL-100(Fe) and various amounts of carbon nanotubes, at a temperature of 25° C. and a pressure of 1.0 atm, wherein a $CO_2$-containing stream having $CO_2$ and N2, with a $CO_2$:N2 volumetric ratio of 1:5.6, is contacted with the $CO_2$ adsorbents.

Figure 5:
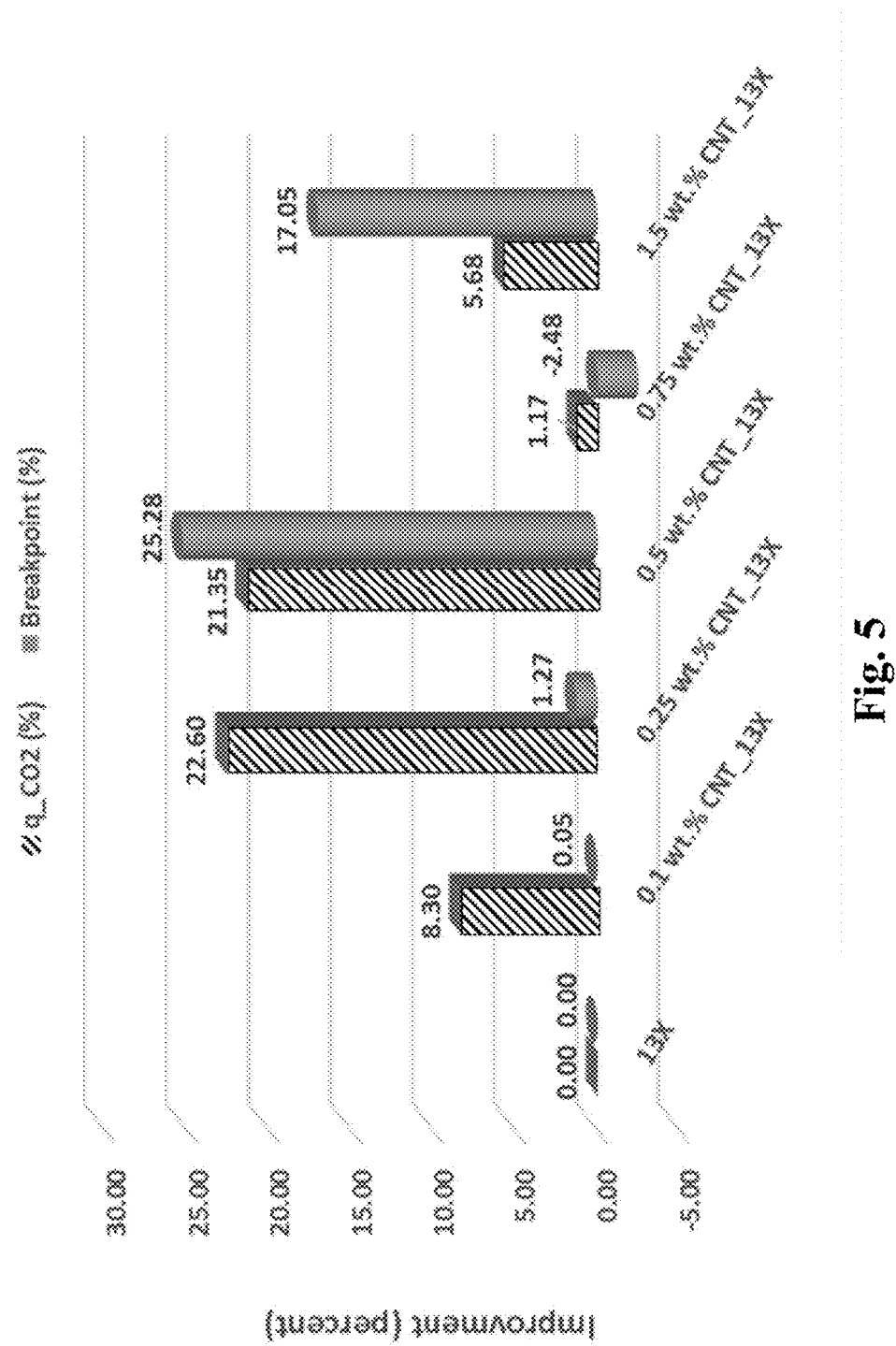
FIG. 5 represents the $CO_2$ adsorption capacity (dashed bars) and the breakpoint onset (solid bars) of $CO_2$ adsorbents having zeolite 13X and various amounts of carbon nanotubes, at a temperature of 25° C. and a pressure of 1.0 atm.
Figure 9:
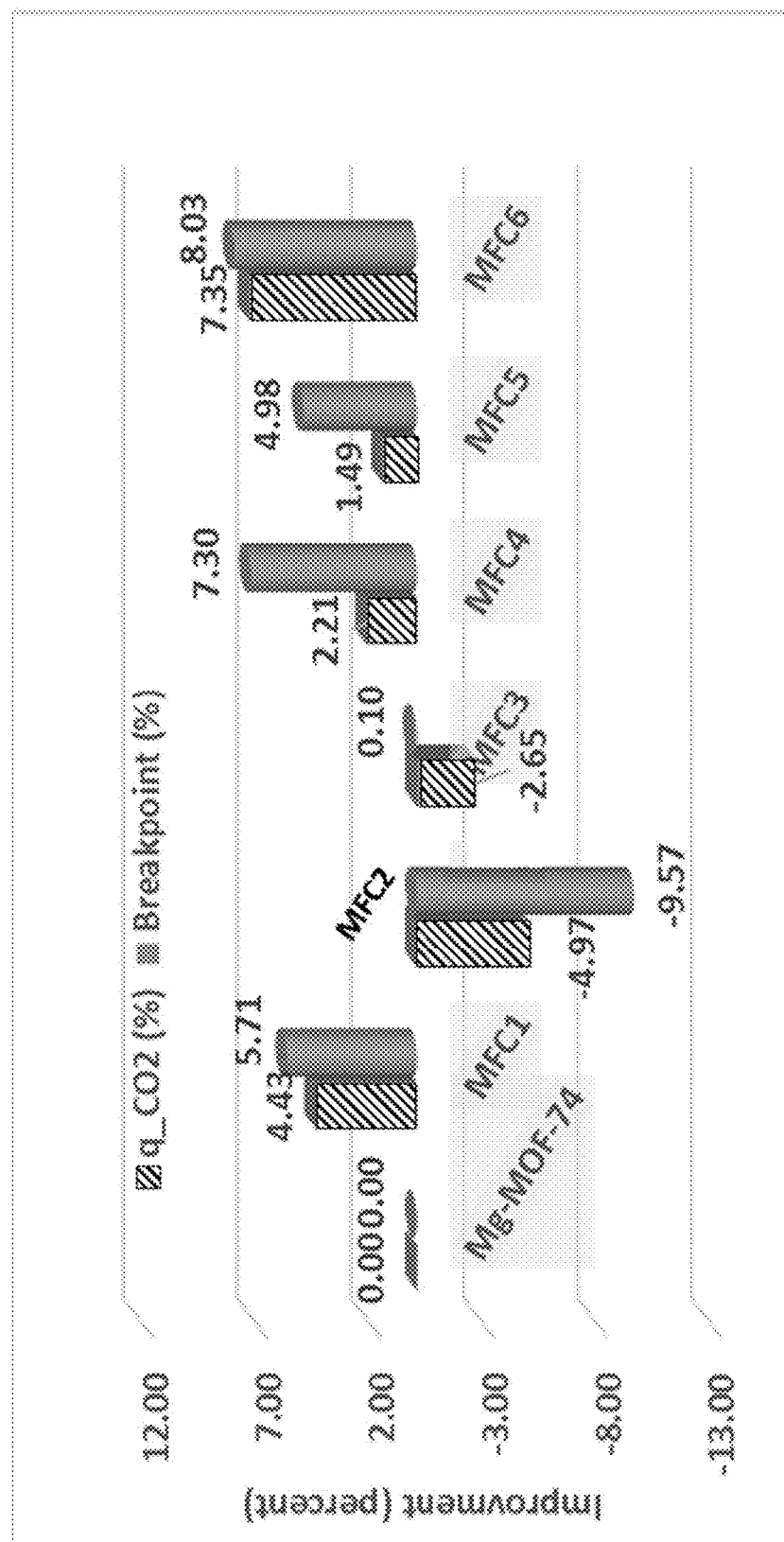
FIG. 9 represents the $CO_2$ adsorption capacity (dashed bars) and the breakpoint onset (solid bars) of $CO_2$ adsorbents having Mg-MOF-74 and various amounts of carbon nanotubes, at a temperature of 25° C. and a pressure of 1.0 atm.
Figure 12:
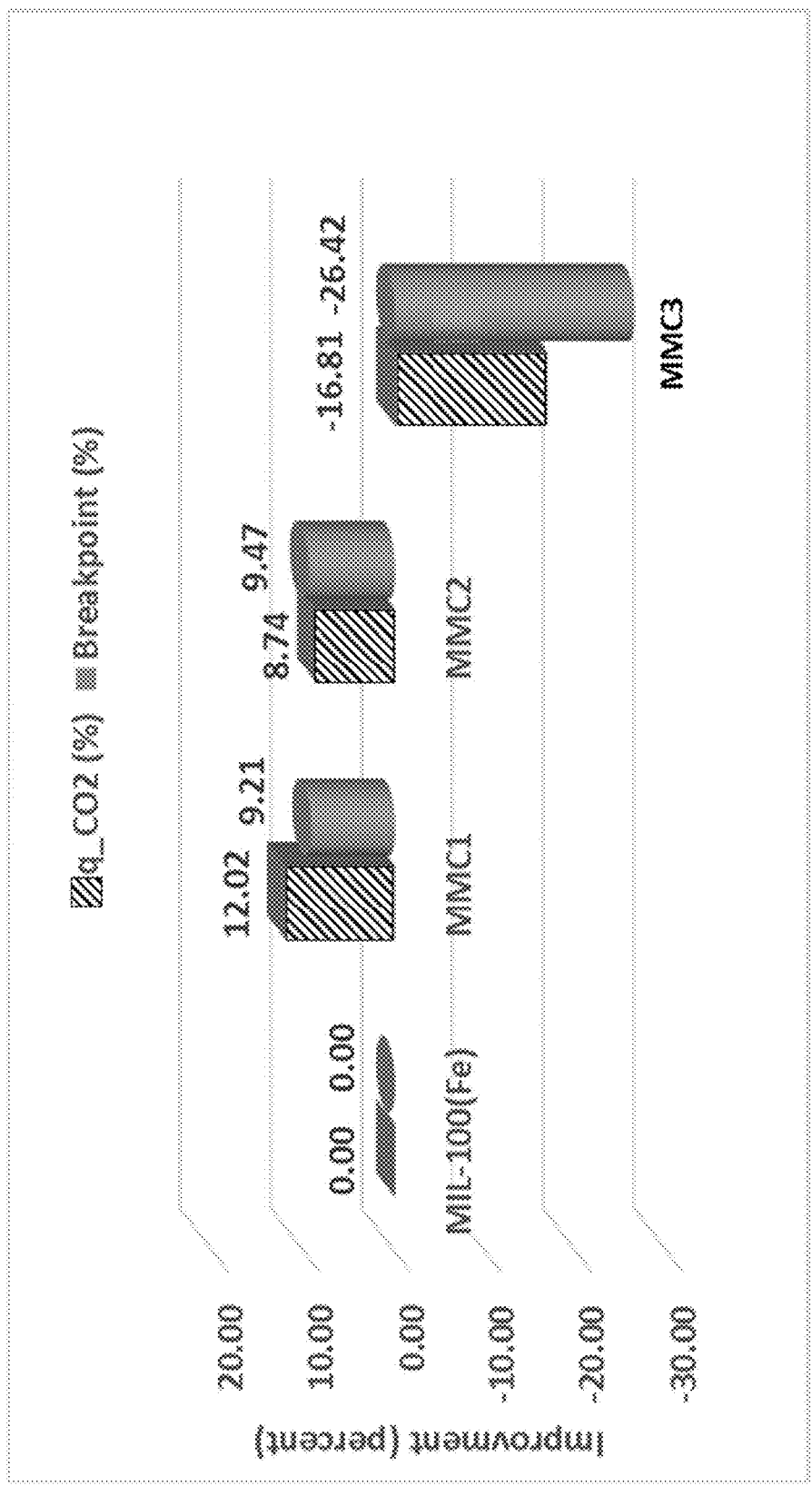
FIG. 12 represents the $CO_2$ adsorption capacity (dashed bars) and the breakpoint onset (solid bars) of $CO_2$ adsorbents having MIL-100(Fe) and various amounts of carbon nanotubes, at a temperature of 25° C. and a pressure of 1.0 atm.

In addition, the levels of enhancement in the adsorption uptake and breakpoint of the $CO_2$ adsorbents are shown in FIG. 5, FIG. 9, and FIG. 12. FIG. 5 represents the $CO_2$ adsorption capacity (dashed bars) and the breakpoint onset (solid bars) of $CO_2$ adsorbents having zeolite 13X and various amounts of carbon nanotubes, at a temperature of 25° C. and a pressure of 1.0 atm. FIG. 9 represents the $CO_2$ adsorption capacity (dashed bars) and the breakpoint onset (solid bars) of $CO_2$ adsorbents having Mg-MOF-74 and various amounts of carbon nanotubes, at a temperature of 25° C. and a pressure of 1.0 atm. FIG. 12 represents the $CO_2$ adsorption capacity (dashed bars) and the breakpoint onset (solid bars) of $CO_2$ adsorbents having MIL-100(Fe) and various amounts of carbon nanotubes, at a temperature of 25° C. and a pressure of 1.0 atm.

In the above figures, the label "MFC" represents the $CO_2$ adsorbents with Mg-MOF-74 and various amounts of carbon nanotubes. Accordingly, MFC1, MFC2, MFC3, MFC4, MFC5, and MFC6 relate to the 0.1 wt % CNT/Mg-MOF-74 adsorbent, the 0.25 wt % CNT/Mg-MOF-74 adsorbent, the 0.5 wt % CNT/Mg-MOF-74 adsorbent, the 0.75 wt % CNT/Mg-MOF-74 adsorbent, the 1 wt % CNT/Mg-MOF-74 adsorbent, and the 1.5 wt % CNT/Mg-MOF-74 adsorbent, respectively. Also, the label "MMC" represents the $CO_2$ adsorbents with MIL-100(Fe) and various amounts of carbon nanotubes. Accordingly, MMC1, MMC2, and MMC3, relate to the 0.1 wt % CNT/MIL-100(Fe) adsorbent, the 0.25 wt % CNT/MIL-100(Fe) adsorbent, and the 0.5 wt % CNT/MIL-100(Fe) adsorbent, respectively.

The invention claimed is:

1. A method of capturing $CO_2$, comprising:
    contacting a $CO_2$-containing stream with a $CO_2$ adsorbent to adsorb at least a portion of $CO_2$ from the $CO_2$-containing stream,
    wherein the $CO_2$ adsorbent comprises an adsorbent matrix comprising a zeolite and/or a metal organic framework, and carbon nanotubes that are dispersed within the adsorbent matrix, wherein the zeolite is zeolite 13X,
    wherein the metal organic framework is selected from the group consisting of Mg-MOF-74 and MIL-100(Fe), and
    wherein a weight percent of the carbon nanotubes in the $CO_2$ adsorbent is in a range of 0.01 wt % to 5.0 wt %, relative to a total weight of the $CO_2$ adsorbent.

2. The method of claim 1, wherein the weight percent of the carbon nanotubes in the $CO_2$ adsorbent is in the range of 0.05 wt % to 1.5 wt %, relative to the total weight of the $CO_2$ adsorbent.

3. The method of claim 1, wherein the adsorbent matrix comprises the zeolite and the metal organic framework.

4. The method of claim 1, further comprising:
    degassing the $CO_2$ adsorbent in a sub-atmospheric pressure prior to the contacting.

5. The method of claim 4, wherein the $CO_2$ adsorbent is degassed in a temperature of no more than 400° C., for no more than 24 hours.

6. The method of claim 1, wherein the $CO_2$-containing stream is contacted with the $CO_2$ adsorbent at a temperature in a range of −20 to 100° C.

7. The method of claim 1, wherein the $CO_2$-containing stream is contacted with the $CO_2$ adsorbent at a pressure in a range of 0.5 to 10 bars.

8. The method of claim 1, wherein the carbon nanotubes are single-walled carbon nanotubes.

9. The method of claim 1, wherein the carbon nanotubes are multi-walled carbon nanotubes.

10. The method of claim 1,
    wherein the $CO_2$-containing stream contains $CO_2$ and at least one gaseous substance selected from the group consisting of nitrogen, oxygen, argon, helium, water vapor, hydrogen, carbon monoxide, methane, and ethane, and
    wherein a volumetric ratio of $CO_2$ to the at least one gaseous substance is in a range of 1:50 to 5:1.

11. The method of claim 1, wherein the carbon nanotubes are dispersed in the adsorbent matrix without forming chemical bonds with the adsorbent matrix.

* * * * *